US011102823B2

(12) United States Patent
Abedini et al.

(10) Patent No.: US 11,102,823 B2
(45) Date of Patent: Aug. 24, 2021

(54) BEAM CONFIGURATION OF A SMART MMW REPEATER FOR FORWARDING RACH MESSAGE 1

(71) Applicant: QUALCOMM Incorporated, San Diego, CA (US)

(72) Inventors: Navid Abedini, Somerset, NJ (US); Junyi Li, Chester, NJ (US); Ashwin Sampath, Skillman, NJ (US)

(73) Assignee: QUALCOMM Incorporated, San Diego, CA (US)

(*) Notice: Subject to any disclaimer, the term of this patent is extended or adjusted under 35 U.S.C. 154(b) by 21 days.

(21) Appl. No.: 16/752,338

(22) Filed: Jan. 24, 2020

(65) Prior Publication Data
US 2021/0235501 A1 Jul. 29, 2021

(51) Int. Cl.
H04W 74/08 (2009.01)
H04B 7/155 (2006.01)
H04W 56/00 (2009.01)
H04W 16/28 (2009.01)

(52) U.S. Cl.
CPC ........ H04W 74/0833 (2013.01); H04B 7/155 (2013.01); H04W 16/28 (2013.01); H04W 56/001 (2013.01)

(58) Field of Classification Search
CPC ............. H04W 74/08; H04W 74/0833; H04W 56/001; H04W 16/28; H04B 7/155; H04B 7/15528; H04B 7/15542; H04B 7/15592
See application file for complete search history.

(56) References Cited

U.S. PATENT DOCUMENTS

| 2019/0268947 | A1* | 8/2019 | Zhang | H04W 74/0833 |
| 2019/0312619 | A1 | 10/2019 | Abedini et al. | |
| 2020/0344810 | A1* | 10/2020 | Xiong | H04L 1/1861 |
| 2020/0383141 | A1* | 12/2020 | Lei | H04B 7/0695 |
| 2021/0037486 | A1* | 2/2021 | Li | H04W 16/28 |
| 2021/0051557 | A1* | 2/2021 | Abedini | H04W 36/0058 |

FOREIGN PATENT DOCUMENTS

WO 2020227267 A1 11/2020

OTHER PUBLICATIONS

International Search Report and Written Opinion—PCT/US2021/014390—ISA/EPO—dated May 3, 2021.

* cited by examiner

Primary Examiner — Paul H Masur
(74) Attorney, Agent, or Firm — The Marbury Law Group

(57) ABSTRACT

Various aspects include methods for receiver (RX) beam sweep configuration of a millimeter wave (MMW) repeater during random access channel (RACH) procedures. Various embodiments may include determining two or more different RX beam sweep configurations for one or more RACH occurrences (ROs) associated with a synchronization signal block (SSB), generating a RACH configuration message indicating the two or more different RX beam sweep configurations for the one or more ROs, and sending the RACH configuration message to an MMW repeater. Various embodiments may also include receiving a RACH configuration message indicating two or more different RX beam sweep configurations for one or more ROs associated with an SSB, and controlling one or more RX antennas of the MMW repeater to perform RX beam sweeping during the one or more ROs according to the RACH configuration message to receive a RACH message 1 from a computing device.

30 Claims, 14 Drawing Sheets

BEAM CONFIGURATION OF A SMART MMW REPEATER FOR FORWARDING RACH MESSAGE 1

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago. One of the methods used for increasing data rates involve transmitting radio frequency (RF) signals toward receiver devices using beam forming antennas rather than via omnidirectional antenna, thereby increasing the number of wireless devices that may be supported by a given base station while increasing transmission power directed at a particular wireless device.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods for receiver (RX) beam sweep configuration of a millimeter wave (MMW) repeater in a fifth generation (5G) network during random access channel (RACH) procedures. In various aspects, the methods may be performed by a processor of a network device, such as a Next Generation NodeB (gNB), etc., and/or performed by a processor of an MMW repeater.

In various aspects, the methods may include determining two or more different RX beam sweep configurations for one or more RACH occurrences (ROs) associated with a synchronization signal block (SSB), generating a RACH configuration message indicating the two or more different RX beam sweep configurations for the one or more ROs, and sending the RACH configuration message to a MMW repeater. In some aspects, the two or more different RX beam sweep configurations may together cover a spatial domain of a transmit (TX) beam sweep configuration for the SSB. In some aspects, the two or more different RX beam sweep configurations may be based at least in part on a beam sweep capability of the MMW repeater. In some aspects, the two or more different RX beam sweep configurations may be based at least in part on a format of a RACH message 1. In some aspects, the two or more different RX beam sweep configurations may be based at least in part on a number of MMW repeaters in use by the gNB.

Various aspects may further include determining a format of a RACH message 1 based at least in part on the two or more different RX beam sweep configurations. In some aspects, the one or more ROs may be a single RO and the RACH configuration message may indicate the MMW repeater is to apply all of the two or more different RX beam sweep configurations during each instance of the single RO. In some aspects, the one or more ROs may be a single RO and the RACH configuration message may indicate the MMW repeater is to apply a next one of the two or more different RX beam sweep configurations at each successive instance of the single RO. In some aspects, the one or more ROs may be two or more ROs and the RACH configuration message may indicate a selected one of the two or more different RX beam sweep configurations the MMW repeater is to apply at each of the respective two or more ROs. Various aspects may further include determining another two or more different RX beam sweep configurations for the RO, generating a new RACH configuration message indicating the another two or more different RX beam sweep configurations for the RO, and sending the new RACH configuration message to the MMW repeater.

Various aspects may further include sending the SSB, and scanning for an RACH message 1 during the one or more ROs. In some aspects, the RACH configuration message may further indicate one or more beams the MMW repeater is to use for relaying the SSB and/or one or more TX beam the MMW repeater is to use for sending any received RACH 1 message to the gNB. Various aspects may further include receiving one or more RACH message 1 s from the MMW repeater, determining a suitable beam for communicating with a UE computing device based at least in part on the received one or more RACH message 1 s, and generating a second RACH configuration message indicating the suitable beam, and sending the second RACH configuration message to the MMW repeater.

Various aspects may further include receiving a RACH configuration message indicating two or more different RX beam sweep configurations for one or more ROs associated with a SSB, and controlling one or more RX antennas of the MMW repeater to perform RX beam sweeping during the one or more ROs according to the RACH configuration message to receive a RACH message 1 form a user equipment (UE) computing device. In some aspects, the one or more ROs may be a single RO and controlling the one or more RX antennas of the MMW repeater to perform RX beam sweeping during the one or more ROs may include controlling the one or more RX antennas of the MMW repeater to apply all of the two or more different RX beam sweep configurations during each instance of the single RO. In some aspects, the one or more ROs may be a single RO and controlling the one or more RX antennas of the MMW repeater to perform RX beam sweeping during the one or more ROs may include controlling the one or more RX antennas of the MMW repeater to apply a next one of the two or more different RX beam sweep configurations during each successive instance of the single RO. In some aspects, the one or more ROs may be two or more ROs and controlling the one or more RX antennas of the MMW repeater to perform RX beam sweeping during the one or more ROs may include controlling the one or more RX antennas of the MMW repeater to apply a selected one of the two or more different RX beam sweep configurations during each of the respective two or more ROs. In some aspects, the RACH configuration message may be received from a Next Generation NodeB (gNB). Various aspects may further include receiving a new RACH configuration message indicating another two or more different RX beam sweep configurations for the one or more ROs, and controlling the one or more RX antennas of the MMW repeater to perform RX beam sweeping during the one or more ROs according to the new RACH configuration message to receive a RACH message 1 form a UE computing device.

Various aspects may further include sending a received RACH message 1 using one or more TX beams to the gNB. In some aspects, the one or more TX beams may be indicated in the RACH configuration message. Various aspects may further include receiving a second RACH configuration message indicating a suitable beam for communicating with the UE computing device and controlling one or more antennas of the MMW repeater to relay a RACH message between the UE computing device and the gNB using the suitable beam.

Further aspects may include a computing device having a processing device configured to perform one or more operations of any of the methods summarized above. Further aspects may include a processing device configured to perform one or more operations of any of the methods summarized above. Further aspects may include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip processing device for use in a computing device configured to perform one or more operations of any of the methods summarized above. Further aspects include a system in a package processing device that includes two systems on chip for use in a computing device and is configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
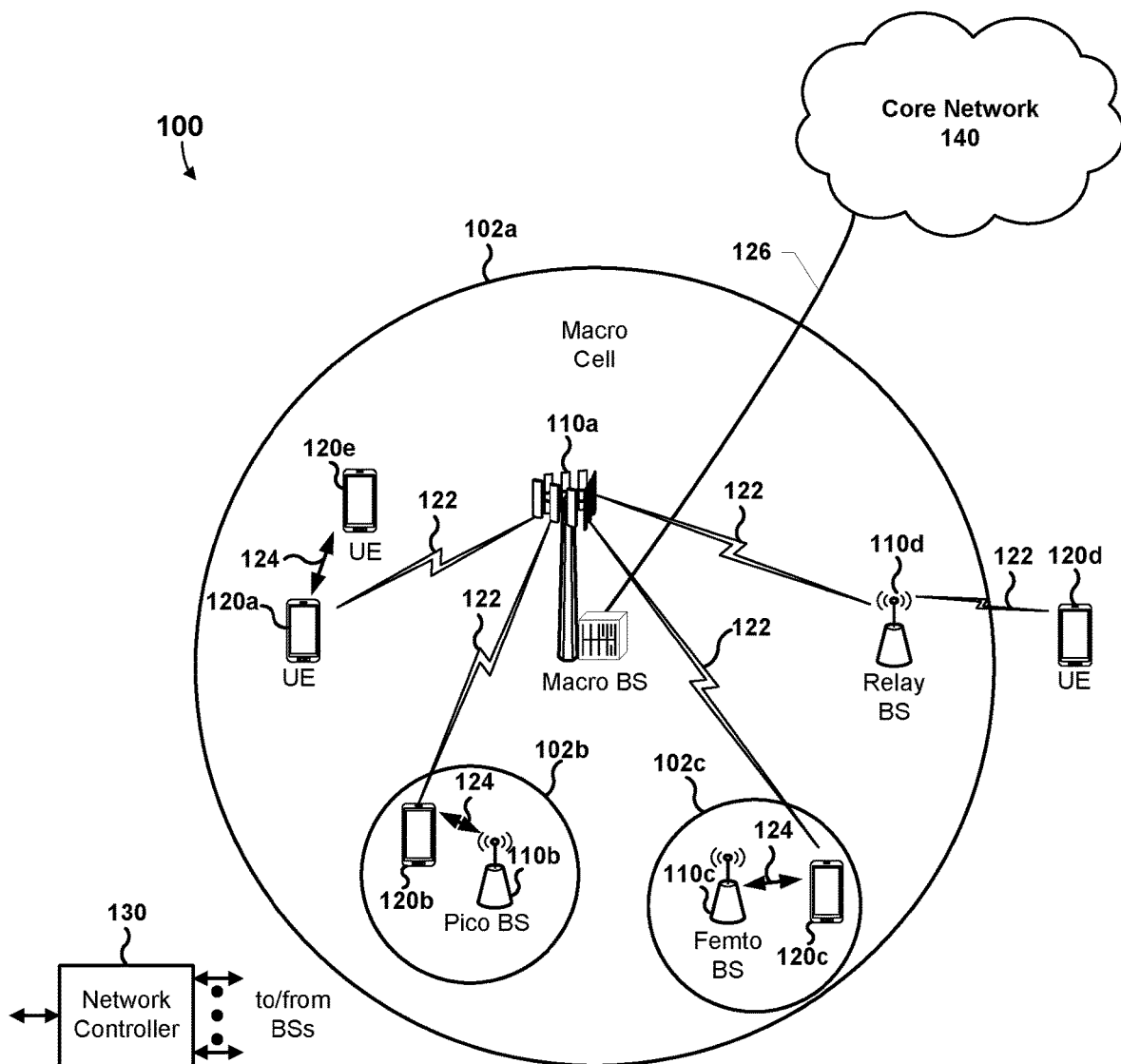
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, cellular communication network devices, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single computing device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute program instructions.

The 3rd Generation Partnership Project (3GPP) defines various protocols that support transmissions in wireless networks, such as third generation wireless mobile communication technologies (3G) (e.g., global system for mobile communications (GSM) evolution (EDGE) systems, etc.), fourth generation wireless mobile communication technologies (4G) (e.g., long term evolution (LTE) systems, LTE-Advanced systems, etc.), fifth generation wireless mobile communication technologies (5G) (5G New Radio (NR) (5G NR) systems, etc.), etc. All of the wireless signals associated with various 3GPP protocols face issues with radio signal blockage. However, signal blockage is an especially challenging problem faced in high frequency communications, such as 5G communications using millimeter wave (MMW) signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.).

MMW repeaters may be used in wireless networks to mitigate signal blockage for 5G communications using MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). MMW repeaters may provide protections against signal blockage, may extend MMW coverage, and may fill in MMW coverage holes in a wireless network.

In NR, a 5G cell, such as a Next Generation NodeB (gNB), may periodically transmit synchronization signal blocks (SSBs) and system information (SI) (e.g., remaining minimum SI (RMSI), which is also referred to as a system information block (SIB) 1. Such information may be transmitted by using beam-sweeping. SI transmissions may be associated with SSB transmissions. For example, RMSI may be sent via the Physical Downlink Control Channel (PDDCH) and/or Physical Downlink Shared Channel (PDSCH) using the same beam sweeping as is used for sending associated SSBs. Following each transmit operation, the 5G cell (e.g., a gNB) may perform one or more receive operations to listen for and receive random access channel (RACH) messages from a UE computing device, such as a RACH 1 message (also referred to as RACH message (MSG) 1 (RACH MSG 1) or message 1 (MSG 1) in NR access procedures). Such receive operations to listen for a RACH message from a UE computing device, such as a RACH 1 message (RACH message 1 or MSG 1), may be referred to as a RACH occurrence (RO). A UE computing device receiving the SSBs and SI (e.g., RMSI) from the 5G cell (e.g., a gNB) may attempt random access with the 5G cell (e.g., a gNB) by sending a RACH 1 message (RACH message 1 or MSG 1). In response to the 5G cell (e.g., a gNB) successfully receiving a RACH 1 message (RACH message 1 or MSG 1) from a UE computing device, the 5G cell (e.g., a gNB) may send a random access response (RAR) message, such as a RACH 2 message (also referred to as a MSG 2 in NR access procedures), to the UE computing device. Further transmit and receive operations between the 5G cell (e.g., a gNB) and the UE computing device may be performed (e.g., transmit and reception of MSG 3, MSG 4, etc.) to enable wireless network access for the UE computing device via the 5G cell (e.g., a gNB).

In network configurations in which one or more repeaters, such as one or more MMW repeaters, are connected to a 5G cell (e.g., a gNB), the one or more repeaters, may be configured to relay the various synchronization signals (e.g., SSBs, SI, etc.) and messages (e.g., RACH MSG 1, RACH MSG 2 (RAR message), MSG 3, MSG 4, etc.) used in the NR access procedure between the UE computing device and the 5G cell (e.g., a gNB).

Various embodiments may enable MMW repeaters to support access procedures for UE computing devices in NR. Various embodiments include methods, systems, and devices for receiver (RX) beam sweep configuration of an MMW repeater in a 5G network during RACH procedures.

Various embodiments may include determining RX beam sweep configurations for ROs associated with SSBs. In various embodiments, the RX beam sweep configurations may be RX beam sweep configurations for use by an MMW repeater during the ROs to receive (or listen for) a RACH message 1 form a UE computing device. The MMW repeater may control its one or more RX antennas, such as one or more phased array antennas, to perform RX beam sweeping according to the RX beam sweep configuration.

In some embodiments, each SSB may be associated with its own respective single RO such that there may be a one-to-one SSB to RO mapping. In a one-to-one SSB to RO mapping, each SSB instance transmitted by a gNB may have a single associated RO instance in which the gNB receives (or listens for) a RACH message 1. In some embodiments, each SSB may be associated with two or more ROs such that there may be a one-to-many SSB to ROs mapping. In a one-to-many SSB to ROs mapping, each SSB instance transmitted by a gNB may have two or more (e.g., 1-m) associated RO instances in which the gNB receives (or listens for) a RACH message 1.

Various embodiments may include determining two or more different RX beam sweep configurations for one or more ROs associated with an SSB. In some embodiments, the two or more different RX beam sweep configurations may together cover a spatial domain of a transmit (TX) beam sweep configuration for the SSB. In some embodiments, the TX beam sweep configuration may be a single (e.g., omni beam) TX beam or a very few TX beam (e.g., pseudo-omni beam) used for transmission of the SSB. The two or more different RX beam sweep configurations may each be finer beams (e.g., beams having greater beamforming gain) than the beam used to transmit the SSB according to the TX beam sweep configuration. The two or more different RX beam sweep configurations may be beams that are quasi co-located (QCLed) with the TX beam used for transmission of the SSB associated with the RO. This may allow the MMW repeater to receive and forward a RACH MSG1 via multiple (e.g., finer) beams during the one or more ROs corresponding to the SSB than the beam used for the transmission of the SSB. In various embodiments, the two or more different RX beam sweep configurations may be applied in the single RO associated with the SSB. In various embodiments, the two or more different RX beam sweep configurations may be applied in periodic instances of the RO associated with the SSB.

In various embodiments, the two or more different RX beam sweep configurations for one or more ROs associated with an SSB may be determined based at least in part on one or more various factors taken alone, or in combination, such as MMW repeater capabilities, RACH message 1 formats, network configurations, etc. The network device (e.g., a gNB) determining the two or more different RX beam sweep configurations may be provisioned with the various factors, such as MMW repeater capabilities, RACH message 1 formats, network configurations, etc., in any manner, such as via messaging from the network and/or the MMW repeater itself, pre-configuration settings, network discovery operations, etc. For example, the beam sweep capabilities of one or more MMW repeater in use by a gNB, the selected format of a RACH message 1, and/or a number of MMW repeaters in use by the gNB, may be indicated to the network device (e.g., a gNB) determining the two or more different RX beam sweep configurations, and the network device (e.g., a gNB) may determine the two or more different RX beam sweep configurations based at least in part on one or more of the beam sweep capabilities of one or more MMW repeater in use by a gNB, the selected format of a RACH message 1, and/or a number of MMW repeaters in use by the gNB.

In various embodiments, the two or more different RX beam sweep configurations for one or more ROs associated with an SSB may be determined prior to the start of a RACH period and may not change across RACH periods. In various embodiments, RX beam sweep configurations may be changed across RACH periods. For example, after a first instance of a RO in which a first set of RX beam sweep configurations was used two or more new different RX beam sweep configurations for the RO may be determined. In this manner, RX beam sweep configurations may be dynamically changed across RACH periods.

In some embodiments, a RACH message 1 configuration may be changed based at least in part on the two or more different RX beam sweep configurations to be used by an MMW repeater. For example, a RACH message 1 format may be lengthened and/or modified to include multiple repetitions of information that may not be present in a default RACH message 1 format. Lengthening the RACH message 1 format and/or including multiple repetitions within the RACH message 1 may make such a RACH message 1 sent by a UE computing device easier to detect than a default RACH message 1. As such the RACH message 1 format may be tailored to the two or more different RX beam sweep configurations.

In various embodiments, a network device (e.g., a gNB) may generate and send a RACH configuration message to an MMW repeater. The RACH configuration message may indicate two or more different RX beam sweep configurations for one or more ROs. In various embodiments, an MMW repeater may receive the RACH configuration message. The MMW repeater may use the RACH configuration message to control one or more RX antennas to perform RX beam sweeping during the one or more ROs to receive a RACH message 1 form UE computing device. In some embodiments, the RACH configuration message may indicate the format of the RACH message 1 to be used by the UE computing device. In some embodiments, the RACH configuration message may further indicate the RX beam the MMW repeater is to use for receiving the SSB from the network computing device (e.g., gNB) and/or one or more TX beams the MMW repeater is to use for sending any received RACH message 1 back to the network computing device (e.g., gNB). In this manner, the RACH configuration message may control the transmit and receipt between the MMW relay and any UE computing devices along with the transmit and receipt between the MMW relay and the network computing device (e.g., gNB) itself. In various embodiments, the RACH configuration message may be sent to the MMW repeater via a control interface between the network device (e.g., a gNB) and the MMW repeater. A control interface may be an out-of-band interface using a different radio technology than that used for RACH operations or a control interface may be an in-band interface using bandwidth of the same carrier frequency (e.g., bandwidth of MMW signals in a mmWave spectrum band) used for RACH operations.

In various embodiments where there may be a single RO associated with a single SSB (e.g., one-to-one SSB to RO mapping), and the RACH configuration message may indicate the MMW repeater is to apply all of the two or more different RX beam sweep configurations during each instance of the single RO. In various embodiments where there may be a single RO associated with a single SSB (e.g., one-to-one SSB to RO mapping), and the RACH configuration message may indicate the MMW repeater is to apply a next one of the two or more different RX beam sweep configurations at each successive instance of the single RO. In this manner, the two or more different beam sweep configurations may be alternated periodically. In various embodiments where there may be two or more ROs associated with a single SSB (e.g., one-to-many SSB to RO mapping), and the RACH configuration message may indicate a selected one of the two or more different RX beam sweep configurations the MMW repeater is to apply at each of the respective two or more ROs.

As a specific example of various embodiment operations, an MMW repeater may use two (wide) TX beams to forward two different SSBs. Associated with each SSB, there may be "N" number of ROs. The MMW repeater may receive a RACH configuration message indicating a first configuration and a second configuration for the RX beams to be used on the ROs associated with the first SSB and the second SSB. The first configuration may instruct the MMW repeater to use "N" different fine RX beams (e.g., 1 per RO) in the ROs associated with the first SSB. The N fine RX beams may be QCLed with the TX beam used for forwarding the first SSB. The second configuration may instruct the MMW repeater to use the same RX beam for all ROs associated with the second SSB.

In various embodiments, a network computing device (e.g., a gNB) may control the beams used by an MMW repeater for relaying RACH messages subsequent to a RACH message 1 (e.g., RAR, MSG 3, MSG 4, etc.). In various embodiments, a network computing device (e.g., a gNB) may determine a suitable beam for the MMW repeater to use to communicate with a potential UE computing device (e.g., a beam used to relay an RAR message from a gNB to a UE computing device, a beam used to relay an MSG 3 from a UE computing device to a gNB, a beam used to relay an MSG 4 from a gNB to a UE computing device, etc.). In various embodiments, a RACH configuration message may indicate multiple TX beams for sending RACH message 1 s from the MMW repeater to the network computing device (e.g., the gNB).

In various embodiments, a network computing device (e.g., a gNB) may receive one or more RACH message 1s from an MMW repeater. The one or more RACH message 1s may have been sent by the MMW repeater using different TX beams. The one or more RACH message 1s may be received by the network computing device (e.g., the gNB) with different powers, different quality measures, and/or at different times. In various embodiments, a network computing device (e.g., a gNB) may determine a suitable beam for the MMW repeater to use to communicate with a potential UE computing device (e.g., a beam used to relay a RAR message from a gNB to a UE computing device, a beam used to relay a MSG 3 from a UE computing device to a gNB, a beam used to relay a MSG 4 from a gNB to a UE computing device, etc.) based at least in part on the received one or more RACH message 1s from the MMW repeater. For example, the determination of the suitable beam may be made based on the relative powers, qualities, and/or timings of the RACH message 1s. In various embodiments, the network computing device (e.g., the gNB) may instruct the MMW repeater to use the suitable beam for relaying subsequent RACH messages to and/or from the UE computing device (e.g., relaying RAR messages, MSG 3s, MSG 4s, etc.). In various embodiments, the network computing device (e.g., the gNB) may generate and send a RACH configuration message indicating the suitable beam for communicating with the UE computing device to an MMW repeater. In various embodiments, in response to receiving the RACH configuration message indicating the suitable beam for communicating with the UE computing device, the MMW repeater may control one or more antenna of the MMW repeater to relay RACH messages to/from the UE computing device (e.g., to relay an RAR message from a gNB to a UE computing device, to relay an MSG 3 from a UE computing device to a gNB, to relay an MSG 4 from a gNB to a UE computing device, etc.) using the suitable beam.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of mobile devices (also referred to as user equipment (UE) computing devices) (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with computing devices (mobile devices or UE computing devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The computing device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other computing devices. In the example illustrated in FIG. 1, a relay station 110d may communicate with macro the base station 110a and the computing device 120d in order to facilitate communication between the base station 110a and the computing device 120d. A relay station also may be referred to as a relay base station, a relay base station, a relay, a repeater, etc.

As a specific example, one type of relay BS 110d may be a millimeter wave (MMW) repeater. A MMW repeater (e.g., relay BS 110d) may relay MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.) between MMW enabled devices, such as between a gNB (e.g., macro BS 110a) and a computing device 120d. A MMW repeater (e.g., relay BS 110d) may provide protection against blockage of a MMW cell, such as a gNB (e.g., macro BS 110a), extend the coverage of the MMW cell, such as a gNB (e.g., macro BS 110a), and/or fill in coverage holes of the MMW cell, such as a gNB (e.g., macro BS 110a).

A MMW repeater (e.g., relay BS 110d) may receive one or more signals on or more of its receiver (RX) antennas based on one or more RX beamforming configurations, amplify the power of the one or more received signals, and transmit the one or more amplified signals from one or more of its transmitter (TX) antennas based on one or more TX beamforming configurations. An MMW repeater (e.g., relay BS 110d) may also exchange one or more control signals with other network devices (e.g., macro BS 110a, network controller 130, donor nodes, control nodes, servers, etc.) via one or more control interfaces. A control interface may be an out-of-band interface using a different radio technology, such as Bluetooth, Bluetooth Low Energy (LE), etc., and/or a different frequency (e.g., the frequencies designated for LTE narrowband Internet of things (NB-IoT) (LTE NB-IoT). Additionally, or alternatively, a control interface may be an in-band interface using bandwidth of the same carrier frequency (e.g., bandwidth of MMW signals in a mmWave spectrum band).

In some configurations, an MMW repeater (e.g., relay BS 110d) may be a low power relay with less functionality than a gNB (e.g., macro BS 110a). For example, the MMW repeater (e.g., relay BS 110d) may receive analog signals on its RX antennas, amplify the power of the received analog signals, and transmit the amplified analog signals from its TX antennas. Such example reduced functionality MMW repeaters (e.g., relay BS 110d) may not include analog-to-digital converters or digital-to-analog converters in their signal paths. Such example reduced functionality MMW repeaters (e.g., relay BS 110d) may be referred to as Layer 1 (L1) and/or physical layer (PHY) repeaters.

In various embodiments, the RX beamforming configurations, TX beamforming configurations, and/or power amplification settings of the MMW repeater (e.g., relay BS 110d) may be controlled by a gNB (e.g., macro BS 110a) that the MMW repeater may be supporting and/or another network device (e.g., network controller 130, donor nodes, control nodes, servers, etc.).

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The computing devices (UE computing devices) 120a, 120b, 120c may be dispersed throughout communications system 100, and each computing device may be stationary or mobile. A computing device also may be referred to as an access terminal, a UE, a terminal, a mobile station, a subscriber unit, a station, etc.

A macro base station 110a may communicate with the communication network 140 over a wired or wireless communication link 126. The computing devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per computing device. Multi-layer transmissions with up to 2 streams per computing device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A computing device 120a-e may be included inside a housing that houses components of the computing device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the computing device 120a and the computing device 120e) may communicate directly using one or more sidelink channels 124 (for example, without using a base station 110a-110d as an intermediary to communicate with one another). For example, the computing devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the computing device 120a-e may perform scheduling operations, resource selection operations, as well as other operations described elsewhere herein as being performed by the base station 110a.

Figure 2:
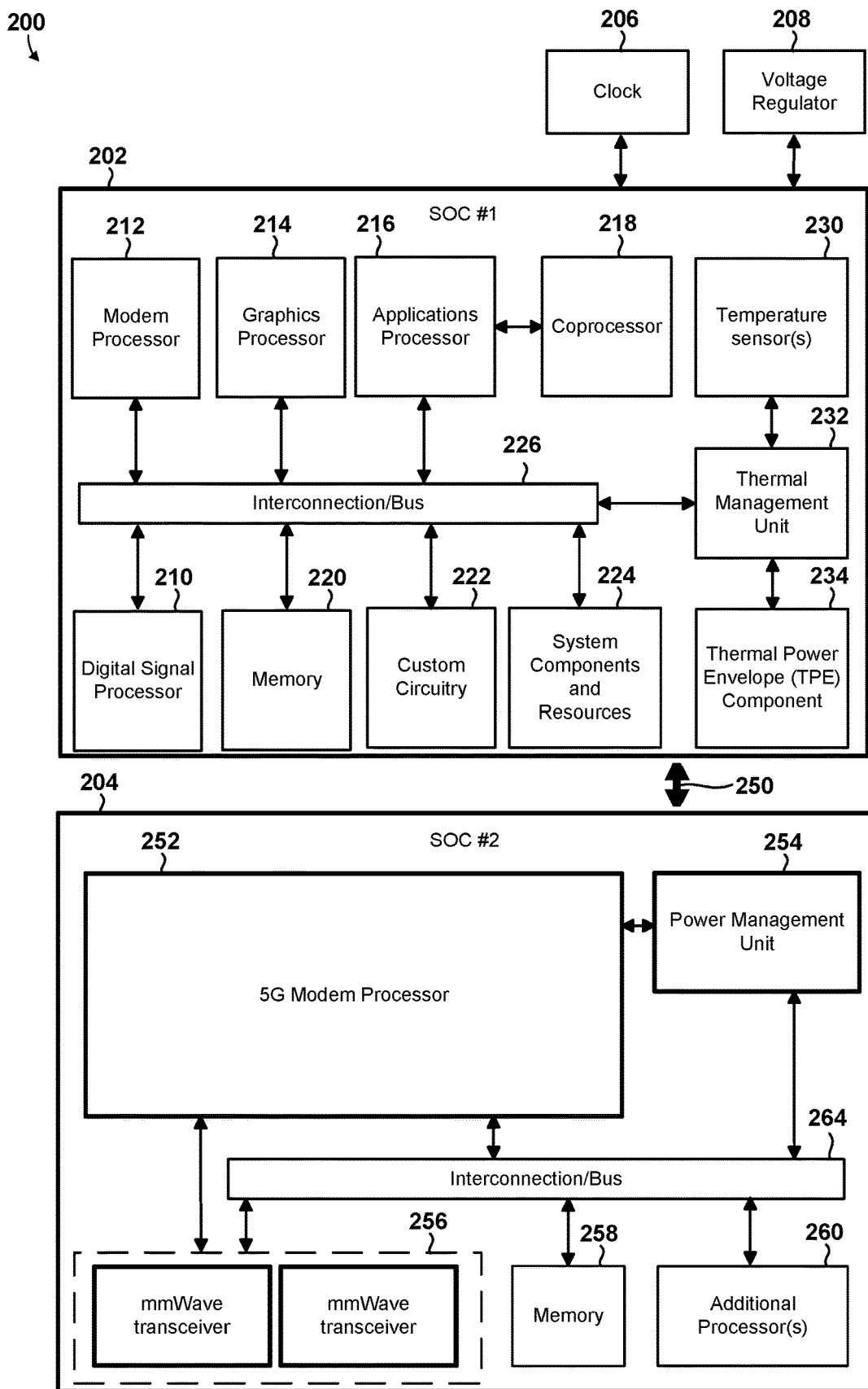
FIG. 2 is a component block diagram illustrating a computing system that may be configured to implement receiver (RX) beam sweep configuration of a millimeter wave (MMW) repeater in accordance with various embodiments.

Various embodiments may be implemented on a number of single processor and multiprocessor processing devices, including a system-on-chip (SOC) or system in a package (SIP), which may be use in a variety of computing devices. FIG. 2 illustrates an example processing device or SIP 200 architecture that may implement various embodiments and be used in computing devices (UE computing devices) implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
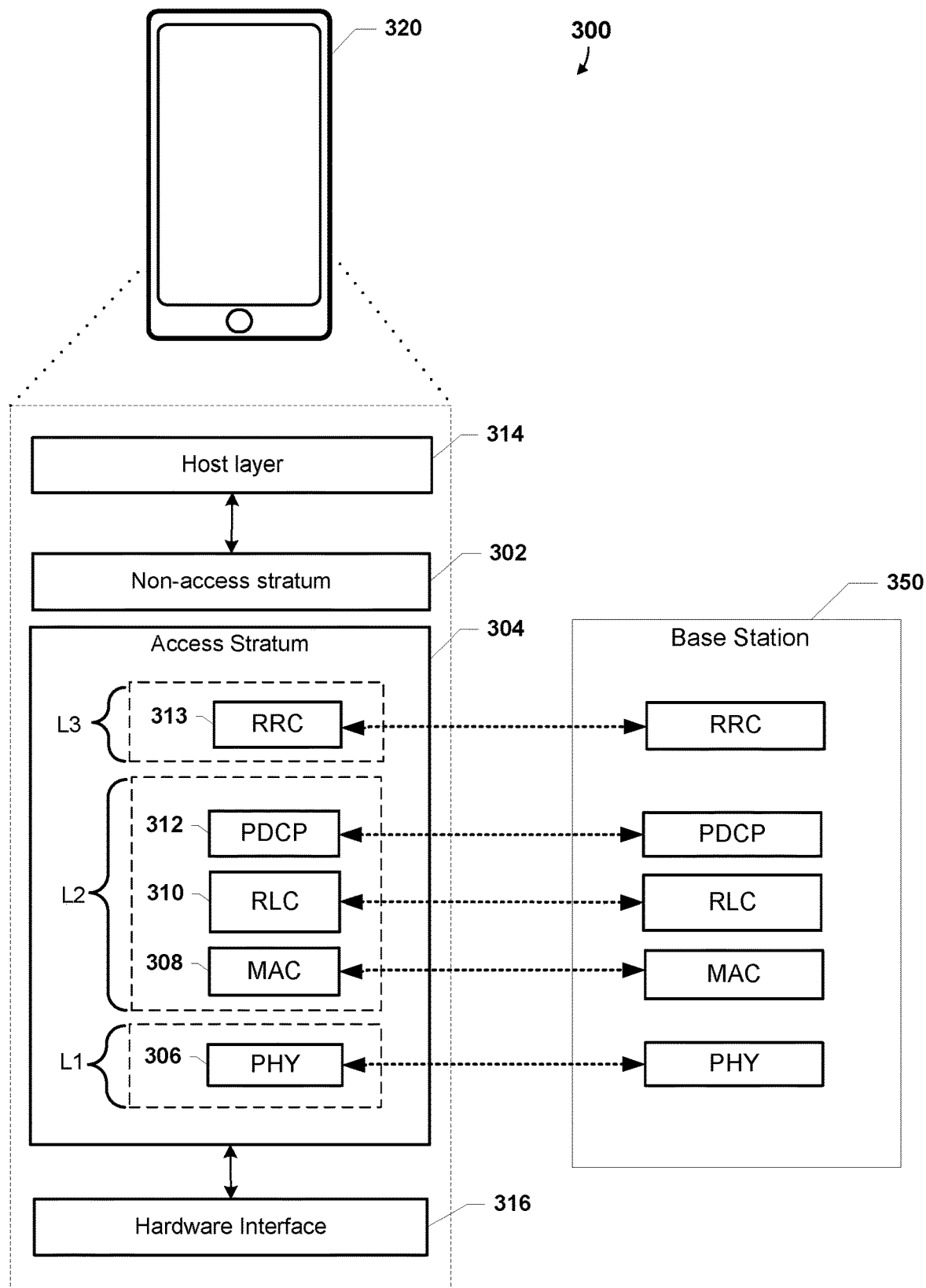
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a computing device (UE computing device) 320 (e.g., the computing device 120a-120e, 200). The wireless communications between the base station 350 (e.g., the base station 110a) and the computing device (UE computing device) 320 (e.g., the computing device 120a-120e, 200) may be direct communications and/or may be communications via a relay, such as a MMW repeater (e.g., the relay BS 110*d*).

With reference to FIGS. 1-3, the computing device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the computing device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the computing device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression. In various embodiments, the PDCP sublayer 312 encode packets for transmission via lower layers and/or decode packets received from low layers and destined for higher layers.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the computing device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
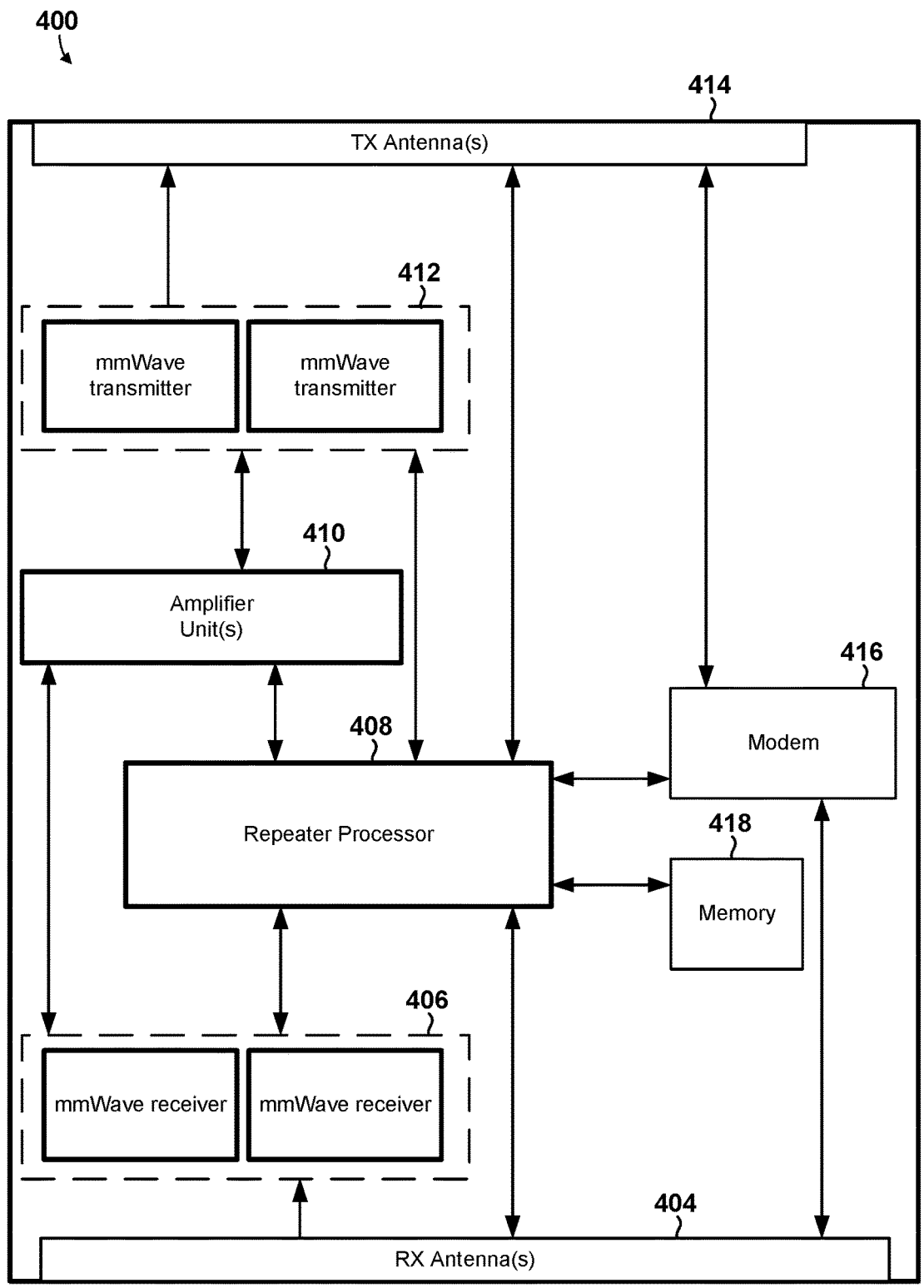
FIG. 4 is a component block diagram illustrating an example MMW repeater configured to implement RX beam sweep configuration in accordance with various embodiments.

Various embodiments may be implemented on a repeater (e.g., BS relay 110*d*), such as an MMW repeater. FIG. 4 illustrates a simplified architecture of an example MMW repeater 400 that may implement various embodiments.

With reference to FIGS. 1-4, the illustrated example MMW repeater 400 may include one or more RX antennas 404, one or more mmWave receivers 406, a repeater processor 408, one or more amplifier units 410, one or more mmWave transmitters 412, one or more TX antennas 414, a memory 418, and one or more modem 416, such as an LTE modem, 5G modem, etc.

The one or more RX antennas 404 may be connected to the one or more mmWave receivers 406 to receive MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). The one or more TX antennas 414 may be connected to the one or more mmWave transmitters 412 to send MMW signals (e.g., MMW signals in mmWave spectrum bands, such as a 24.25-27.5 GHz mmWave spectrum band, a 26.5-29.5 GHz mmWave spectrum band, a 27.5-28.35 GHz mmWave spectrum band, a 37-40 GHz mmWave spectrum band, etc.). The one or more TX antennas 414 and/or the one or more RX antennas 404 may be array type antennas, such as phased array antennas, configured to support beamforming and/or MIMO transmission/reception.

The one or more amplifier units 410 may amplify the power of MMW signals received via the one or more RX antennas and the one or more mmWave receivers 406 and transmit the one or more amplified MMW signals via the one or more mmWave transmitters 412 and one or more TX antennas 414. In some configurations, the MMW repeater 400 may be a low power relay with less functionality than a gNB (e.g., macro BS 110a). For example, the MMW repeater 400 may receive analog signals on its RX antennas 404 and mmWave receivers 406, amplify the power of the received analog signals via its amplifier units 410, and transmit the amplified analog signals from its mmWave transmitters 412 and TX antennas 414. Such reduced functionality MMW repeaters may not include analog-to-digital converters or digital-to-analog converters in their signal paths. Such example reduced functionality MMW repeaters may be referred to as Layer 1 (L1) and/or physical layer (PHY) repeaters.

A repeater processor 408 may be connected to the one or more RX antennas 404, the one or more mmWave receivers 406, the one or more amplifier units 410, the one or more mmWave transmitters 412, and/or the one or more TX antennas 414 to control the operations of the one or more RX antennas 404, the one or more mmWave receivers 406, the one or more amplifier units 410, the one or more mmWave transmitters 412, and/or the one or more TX antennas 414. For example, the repeater processor 408 may control the one or more RX antennas and/or the one or more mmWave receivers 404 to receive analog MMW signals with one or more RX beamforming configurations. For example, the repeater processor 408 may control the one or more amplifier units to amplify analog MMW signals. For example, the repeater processor 408 may control the one or more mmWave transmitters 412 and/or the one or more TX antennas 414 to transmit amplified analog MMW signals with on one or more TX beamforming configurations. The repeater processor 408 may control the one or more RX antennas 404, the one or more mmWave receivers 406, the one or more amplifier units 410, the one or more mmWave transmitters 412, and/or the one or more TX antennas 414 to enable transmission and/or reception over the air interface thereby relaying Layer 1 (L1) services such as physical layer (PHY) services.

The MMW repeater 400 may also exchange one or more control signals with other network devices (e.g., macro BS 110a, network controller 130, donor nodes, control nodes, servers, etc.) via one or more control interfaces. A control interface may be an out-of-band interface using a different radio technology, such as Bluetooth, Bluetooth Low Energy (LE), etc., and/or a different frequency (e.g., the frequencies designated for LTE narrowband internet of things (NB-IoT) (LTE NB-IoT). For example, the control interface may be established via out-of-band communications established with the a gNB (e.g., macro BS 110a) using the modem 416. Additionally, or alternatively, a control interface may be an in-band interface using bandwidth of the same carrier frequency (e.g., bandwidth of MMW signals in a mmWave spectrum band). For example, communications over a control channel via the one or more RX antennas 404, the one or more mmWave receivers 406, the one or more amplifier units 410, the one or more mmWave transmitters 412, and/or the one or more TX antennas 414 with a gNB (e.g., macro BS 110a) may be used to establish an in-band control interface.

Whether in-band and/or out-of-band, a control interface may be used by another network device (e.g., macro BS 110a, network controller 130, donor node, control node, server, etc.) to control TX beamforming configurations, RX beamforming configurations, and/or power amplification configurations of the MMW repeater 400 by sending instruction (e.g., setting indications, etc.) to the repeater processor 408. For example, a gNB (e.g., macro BS 110a) may send a message to the repeater processor 408 of the MMW repeater 400 via a control interface that instructions the repeater processor 408 of the MMW repeater 400 to control the one or more RX antennas 404, the one or more mmWave receivers 406, the one or more amplifier units 410, the one or more mmWave transmitters 412, and/or the one or more TX antennas 414 to achieve selected TX beamforming configurations, RX beamforming configurations, and/or power amplification configurations at the MMW repeater 400.

Figure 5:
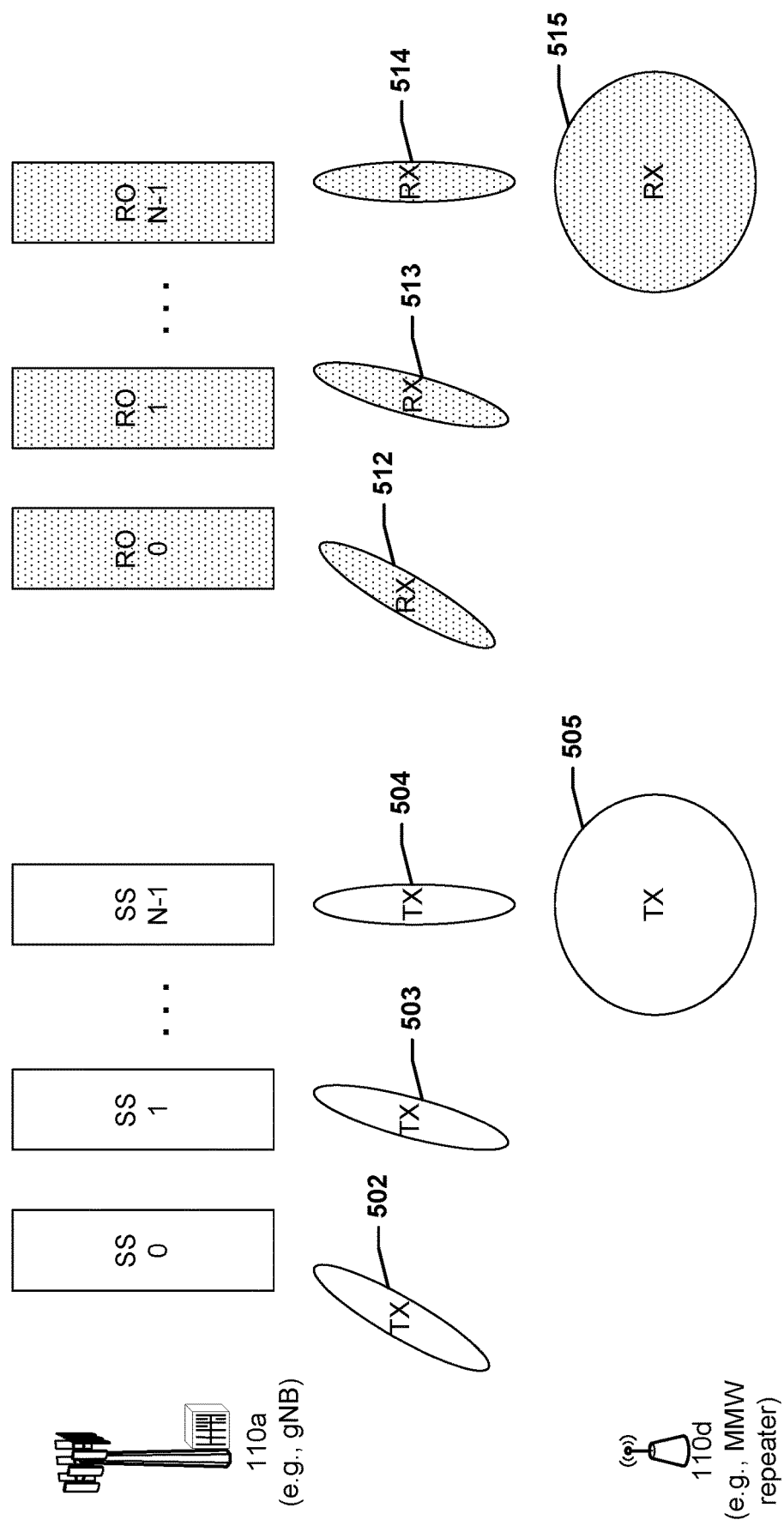
FIG. 5 is a block diagram of an example RX beam sweep configuration of an MMW repeater.

FIG. 5 is a block diagram of an example RX beam sweep configuration of an MMW repeater, such as a relay BS 110d, by a gNB, such as macro BS 110a, in a 5G network for supporting RACH procedures using NR. With reference to FIGS. 1-5, the gNB may generate and send a RACH configuration message to the MMW repeater indicating a TX beam form 505 and a RX beam form 515 to use during RACH procedures. The RACH configuration message may be sent over a control interface, such as an in-band interface or an out-of-band interface, between the gNB and MMW repeater. The RACH configuration message may indicate the number "N" SSBs in use by the gNB, may indicate the periods of the SSBs, such as SS0, SS1, through SSN-1, etc., may indicate the number "N" of ROs in use by the gNB, and may indicate the periods of the ROs, such as RO0, RO1, through RON-1, etc. The RACH configuration message may associate SSBs, such as SS0, SS1, through SSN-1, etc., with corresponding ROs, such as RO0, RO1, through RON-1, etc. The RACH configuration message may indicate the TX beam form the MMW repeater is to use during a specific SSB, such as TX beam form 505 during SSB SSN-1. The RACH configuration message may indicate the RX beam form the MMW repeater is to use during a specific RO, such as RX beam form 515 during RO RON-1.

During RACH procedures, the gNB may transmit SSBs and/or SI using different TX beam forms 502, 503, and 504 during respective SSBs, SS0, SS1, SSN-1, etc., and may receive (or listen for) RACH messages, such as RACH message 1, using different RX beam forms 512, 513, 514, etc. The MMW repeater may relay SSBs and/or SI from the gNB by transmitting any received SSBs and/or SI from the gNB using TX beam form 505 during the SSB SSN-1, thereby relaying such SSBs and/or SI using TX beam form 505 as specified in the RACH configuration message. Similarly, the MMW repeater may relay any RACH message 1 received from a UE computing device by using a RX beam 515 to receive (or listen for) any RACH message is during the RO RON-1.

Figure 6:
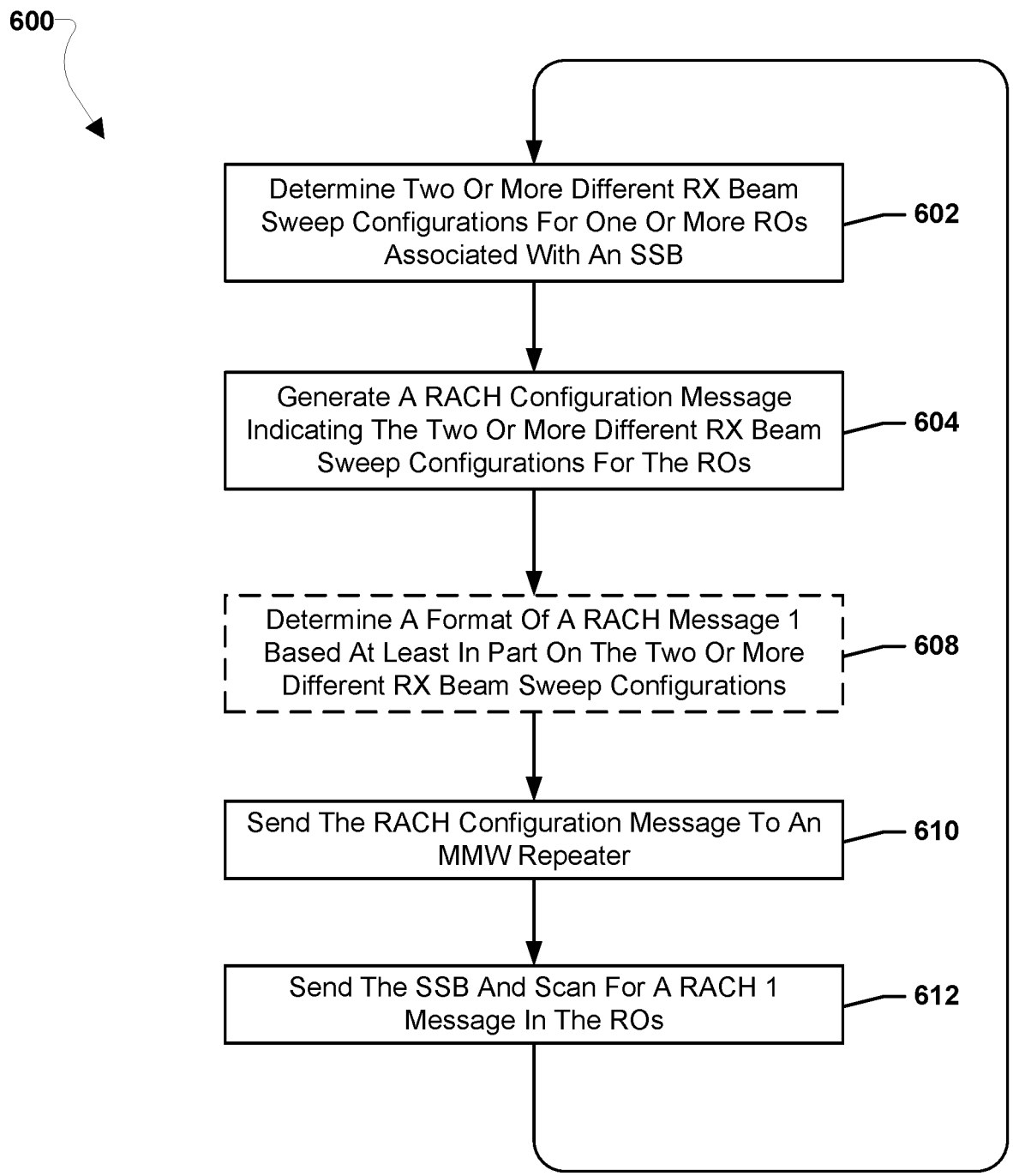
FIG. 6 is a process flow diagram illustrating a method for RX beam sweep configuration of an MMW repeater according to an embodiment.

FIG. 6 is a process flow diagram illustrating a method for RX beam sweep configuration of an MMW repeater according to an embodiment. With reference to FIGS. 1-6, the method 600 may be implemented by a processor of network device, such as a base station (e.g., the base station 110a (e.g., a gNB), 350), network controller 130, donor nodes, control nodes, servers, etc.

In block 602, the processor may determine two or more different RX beam sweep configuration for one or more ROs associated with an SSB. In some embodiments, each SSB may be associated with its own respective single RO such that there may be a one-to-one SSB to RO mapping. In a one-to-one SSB to RO mapping, each SSB instance transmitted by a gNB may have a single associated RO instance in which the gNB receives (or listens for) a RACH message 1. In some embodiments, each SSB may be associated with two or more ROs such that there may be a one-to-many SSB to ROs mapping. In a one-to-many SSB to ROs mapping, each SSB instance transmitted by a gNB may have two or more (e.g., 1-m) associated RO instances in which the gNB receives (or listens for) a RACH message 1.

In some embodiments, the two or more different RX beam sweep configurations may together cover a spatial domain of a transmit (TX) beam sweep configuration for the SSB. In some embodiments, the TX beam sweep configuration may be a single (e.g., omni beam) TX beam or a very few TX beam (e.g., pseudo-omni beam) used for transmission of the SSB. The two or more different RX beam sweep configurations may each be finer beams (e.g., beams having greater beamforming gain) than the beam used to transmit the SSB according to the TX beam sweep configuration. The two or more different RX beam sweep configurations may be beams that are QCLed with the TX beam used for transmission of the SSB associated with the RO. This may allow the MMW repeater to receive and forward a RACH MSG1 via multiple (e.g., finer) beams during the one or more ROs corresponding to the SSB than the beam used for the transmission of the SSB. In various embodiments, the two or more different RX beam sweep configurations may be applied in the single RO associated with the SSB. In various embodiments, the two or more different RX beam sweep configurations may be applied in periodic instances of the RO associated with the SSB.

In various embodiments, the two or more different RX beam sweep configurations for one or more ROs associated with an SSB may be determined based at least in part on one or more various factors taken alone, or in combination, such as MMW repeater capabilities, RACH message 1 formats, network configurations, etc. The network device (e.g., a gNB) determining the two or more different RX beam sweep configurations may be provisioned with the various factors, such as MMW repeater capabilities, RACH message 1 formats, network configurations, etc., in any manner, such as via messaging from the network and/or the MMW repeater itself, pre-configuration settings, network discovery operations, etc. For example, the beam sweep capabilities of one or more MMW repeater in use by a gNB, the selected format of a RACH message 1, and/or a number of MMW repeaters in use by the gNB, may be indicated to the network device (e.g., a gNB) determining the two or more different RX beam sweep configurations, and the network device (e.g., a gNB) may determine the two or more different RX beam sweep configurations based at least in part on one or more of the beam sweep capabilities of one or more MMW repeater in use by a gNB, the selected format of a RACH message 1, and/or a number of MMW repeaters in use by the gNB.

In block 604, the processor may generate a RACH configuration message indicating the two or more different RX beam sweep configurations for the ROs. The RACH configuration message may indicate two or more different RX beam sweep configurations for one or more ROs. In some embodiments, the RACH configuration message may indicate the format of the RACH message 1 to be used by the UE computing device. In various embodiments where there may be a single RO associated with a single SSB (e.g., one-to-one SSB to RO mapping), and the RACH configuration message may indicate the MMW repeater is to apply all of the two or more different RX beam sweep configurations during each instance of the single RO. In various embodiments where there may be a single RO associated with a single SSB (e.g., one-to-one SSB to RO mapping), and the RACH configuration message may indicate the MMW repeater is to apply a next one of the two or more different RX beam sweep configurations at each successive instance of the single RO. In this manner, the two or more different beam sweep configurations may be alternated periodically. In various embodiments where there may be two or more ROs associated with a single SSB (e.g., one-to-many SSB to RO mapping), and the RACH configuration message may indicate a selected one of the two or more different RX beam sweep configurations the MMW repeater is to apply at each of the respective two or more ROs. In some embodiments, the RACH configuration message may further indicate the RX beam the MMW repeater is to use for receiving the SSB from the network computing device (e.g., gNB) and/or one or more TX beams the MMW repeater is to use for sending any received RACH message 1 back to the network computing device (e.g., gNB). In this manner, the RACH configuration message may control the transmit and receipt between the MMW relay and any UE computing devices along with the transmit and receipt between the MMW relay and the network computing device (e.g., gNB) itself.

In optional block 608, the processor may determine a format of a RACH message 1 based at least in part on the two or more different RX beam sweep configurations. Block 608 may be optional as the RACH message 1 format may not be changed (or may remain a default format) in various embodiments. A RACH message 1 configuration may be changed based at least in part on the two or more different RX beam sweep configurations to be used by an MMW repeater. For example, a RACH message 1 format may be lengthened and/or modified to include multiple repetitions of information that may not be present in a default RACH message 1 format. Lengthening the RACH message 1 format and/or including multiple repetitions within the RACH message 1 may make such a RACH message 1 sent by a UE computing device easier to detect than a default RACH message 1. As such the RACH message 1 format may be tailored to the two or more different RX beam sweep configurations. In various embodiments, the determined format of the RACH message 1 may be indicated in the RACH configuration message.

In block 610, the processor may send the RACH configuration message to an MMW repeater. In various embodiments, the RACH configuration message may be sent via a control interface between the network device (e.g., a gNB) and an MMW repeater. A control interface may be an out-of-band interface using a different radio technology that that used for RACH processes or a control interface may be an in-band interface using bandwidth of the same carrier frequency (e.g., bandwidth of MMW signals in a mmWave spectrum band) used for RACH processes.

In block 612, the processor may send the SSB and scan for a RACH 1 message in the one or more ROs. In this manner, the processor of the network device (e.g., a gNB) may perform initial RACH procedures. As an example, a gNB may send the SSB using one or more TX beam forms associated with respective SSBs and may receive (or listen for) RACH messages, such as RACH message 1, using different RX beam forms. The SSB may be relayed to UE computing devices by the MMW repeater receiving the RACH configuration message and the MMW repeater may relay any RACH message 1 received from a UE computing device during the RO.

In some embodiments, the RACH configuration message may be sent only once and the two or more different RX beam sweep configurations for the ROs may be static. In other embodiments, the method 600 may be repeated continuously, periodically or episodically as RACH periods occur. In this manner, RX beam sweep configurations may be changed across RACH periods. For example, after a first instance of a RO in which a first set of RX beam sweep configurations was used two or more new different RX beam sweep configurations for the RO may be determined.

Figure 7:
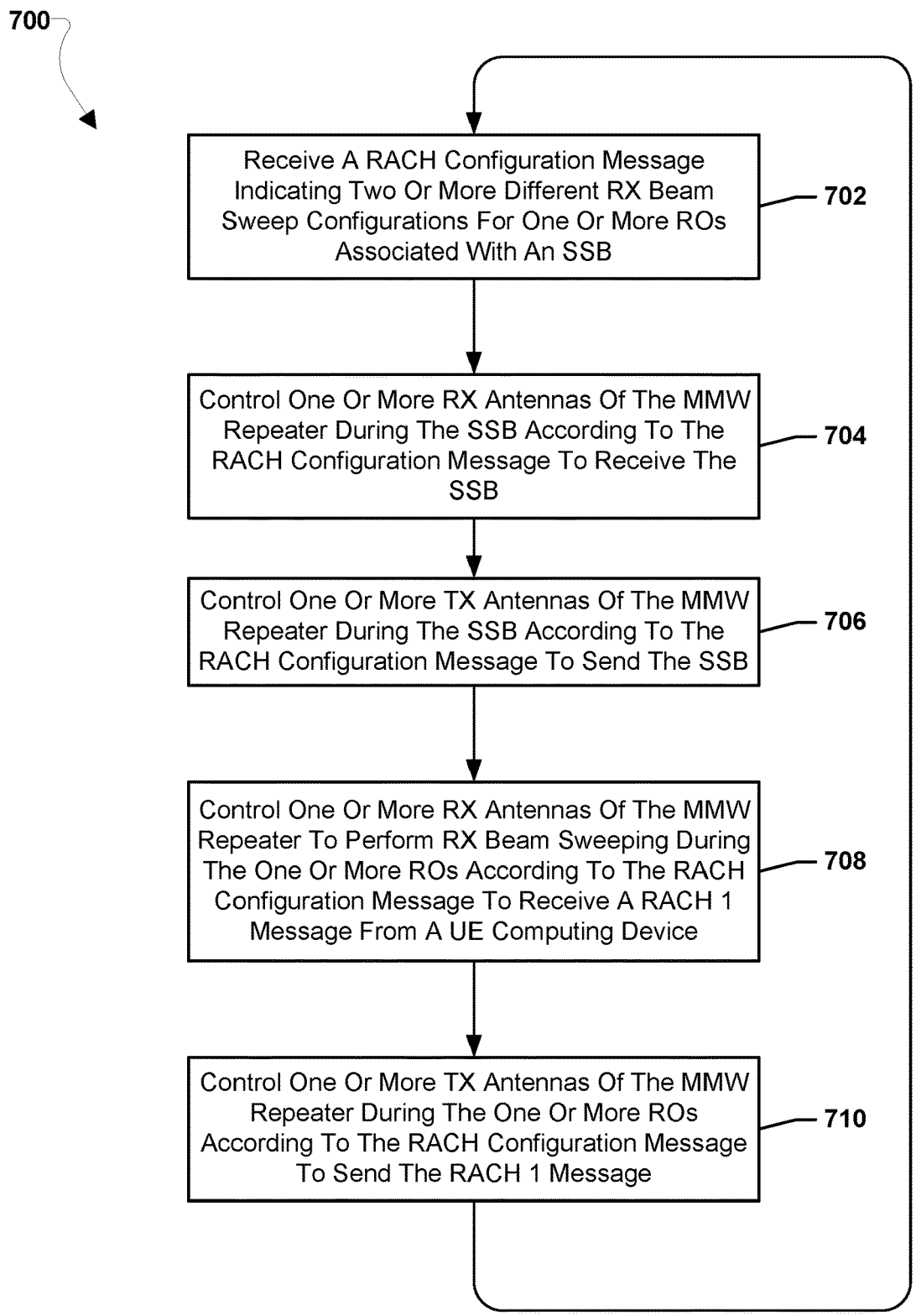
FIG. 7 is a process flow diagram illustrating a method for RX beam sweep configuration of an MMW repeater according to an embodiment.

FIG. 7 is a process flow diagram illustrating a method for RX beam sweep configuration of an MMW repeater according to an embodiment. With reference to FIGS. 1-7, the method 700 may be implemented by a processor of a relay base station (e.g., the base station 110d, the MMW repeater 400). In various embodiments, the operations of method 700 may be performed in conjunction with the operations of method 600. In some embodiments, the operations of method 700 may be performed by a low power relay with less functionality than a gNB, such as an MMW repeater that may not include analog-to-digital converters or digital-to-analog converters in its signal path.

In block 702, the processor may receive a RACH configuration message indicating two or more different RX beam sweep configurations for one or more ROs associated with an SSB. In various embodiments, the RACH configuration message may be a RACH configuration message generated and sent according to the operations of method 600 described with reference to FIG. 6. In various embodiments, the RACH configuration message may be received via a control interface between a network device (e.g., a gNB) and the replay base station. A control interface may be an out-of-band interface using a different radio technology than used for RACH processes or a control interface may be an in-band interface using bandwidth of the same carrier frequency (e.g., bandwidth of MMW signals in a mmWave spectrum band) used for RACH processes. In various embodiments, the RACH configuration message may indicate the RX beam the MMW repeater is to use for receiving the SSB from the network computing device (e.g., gNB), the TX beam the MMW repeater is to use for relaying (sending) the SSB, the two or more different RX beam sweep configurations for the ROs, and/or one or more TX beams the MMW repeater is to use for sending any received RACH message 1 back to the network computing device (e.g., gNB). In this manner, the RACH configuration message may control beamforming on the uplink (UL) and downlink (DL) between the network computing device (e.g., gNB) and the MMW repeater and beamforming on the UL and DL between the MMW repeater and UE computing devices during RACH procedures.

In block 704, the processor may control one or more RX antennas of the MMW repeater according to the RACH configuration message to receive the SSB. In various embodiments, in response to the RACH configuration message, the processor may control one or more RX antennas to apply an RX beam configuration indicated in the RACH configuration message to receive the SSB from the network computing device (e.g., gNB).

In block 706, the processor may control one or more TX antennas of the MMW repeater according to the RACH configuration message to send the SSB. In various embodiments, in response to the RACH configuration message, the processor may control one or more TX antennas to apply a TX beam configuration indicated in the RACH configuration message to broadcast the SSB from the MMW repeater. In this manner, the RACH configuration message may control the relay of the SSB from the MMW repeater to a UE computing device.

In block 708, the processor may control one or more RX antennas of the MMW repeater to perform RX beam sweeping during the one or more ROs according to the RACH configuration message to receive a RACH 1 message from a UE computing device. In various embodiments, in response to the RACH configuration message, the processor may control the one or more RX antennas to apply all of the two or more different RX beam sweep configurations during each instance of a single RO. In various embodiments, in response to the RACH configuration message, the processor may control the one or more RX antennas to apply a next one of the two or more different RX beam sweep configurations at each successive instance of a single RO. In this manner, the two or more different beam sweep configurations may be alternated periodically. In various embodiments, in response to the RACH configuration message, the processor may control the one or more RX antennas to apply a selected one of the two or more different RX beam sweep configurations at each of a respective two or more ROs.

In block 710, the processor may control one or more TX antennas of the MMW repeater during the one or more ROs according to the RACH configuration message to send the RACH 1 message to the network computing device (e.g., the gNB). In this manner, the MMW repeater may relay a received RACH message 1 from the UE computing device to the network computing device (e.g., the gNB). In some embodiments, a single TX beamform may be used to relay the RACH 1 message. In some embodiments, multiple TX beamforms may be used to relay the RACH 1 message. The use of multiple TX beamforms to relay the RACH 1 message may cause multiple copies of the RACH 1 message to be transmitted from the network computing device (e.g., the gNB).

The method 700 may be repeated continuously, periodically or episodically as RACH periods occur.

FIGS. 8-11 illustrate example RX beam sweep configurations of an MMW repeater according to operations of the embodiment methods 600 and 700.

With reference to FIGS. 1-8, FIG. 8 illustrates a one-to-many mapping of ROs to SSBs, such that each SSB has a number "m" of multiple RO instances, 1-m. For example, when m=2 such that there are two RO instances for each SSB, the SSN-1 may be associated with RON-1_1 and RON-1_m. The gNB may generate and send a RACH configuration message to the MMW repeater indicating a TX beam form 505 and two RX beam forms 802 and 804 to use during RACH procedures. The RX beam form 802 may be indicated for use by the MMW repeater in the RO instance RON-1_1 and the RX beam form 804 may be indicated for use by the MMW repeater in the RO instance RON-1_m. During the period of the RO instance RON-1_1, the MMW repeater may control one or more of its RX antennas to generate the RX beam form 802. During the period of the RO instance RON-1_m, the MMW repeater may control one or more of its RX antennas to generate the RX beam form 804. In some embodiments, the RX beam forms 802 and 804 may each be finer beams (e.g., beams having greater beamforming gain) than the beam used to transmit the SSB according to the TX beam sweep form 505. The RX beam sweep forms 802 and 804 may be beams that are QCLed with the TX beam form 505. The MMW repeater may relay any RACH message 1 received from a UE computing device by using a RX beam 802 to receive (or listen for) any RACH message is during the RO RON-1_1 and may relay any RACH message 1 received from a UE computing device by using a RX beam 804 to receive (or listen for) any RACH message is during the RO RON-1_m.

With reference to FIGS. 1-9, FIG. 9 illustrates a one-to-one mapping of ROs to SSBs, similar to that discussed in relation to FIG. 5. The gNB may generate and send a RACH configuration message to the MMW repeater indicating a TX beam form 505 and two RX beam forms 802 and 804 to use during RACH procedures. The RX beam forms 802 and 804 may both be indicated for use by the MMW repeater in the RO instance RON-1. During the period of the RO instance RON-1, the MMW repeater may control one or more of its RX antennas to generate the RX beam form 802 for a first period of time and during a second period time may control one or more of its RX antennas to generate the RX beam form 804. In some embodiments, the RX beam forms 802 and 804 may each be finer beams (e.g., beams having greater beamforming gain) than the beam used to transmit the SSB according to the TX beam sweep form 505. The RX beam sweep forms 802 and 804 may be beams that are QCLed with the TX beam form 505. The MMW repeater may relay any RACH message 1 received from a UE computing device by using a RX beam 802 or RX beam 804 to receive (or listen for) any RACH message 1s during the RO RON-1.

Figure 8:
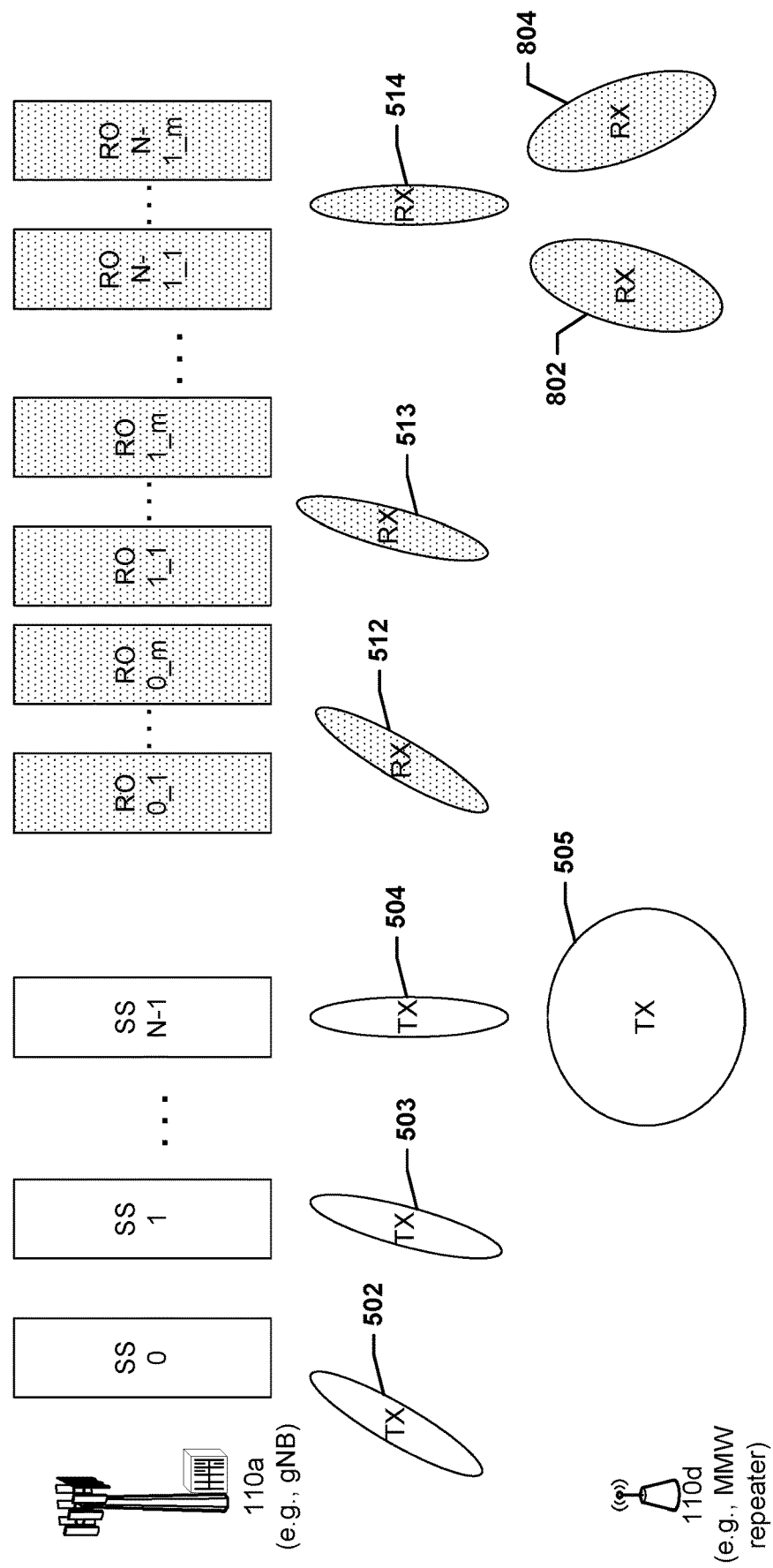
FIGS. 8-11 are block diagrams of example RX beam sweep configurations of an MMW repeater according to various embodiments.
Figure 9:
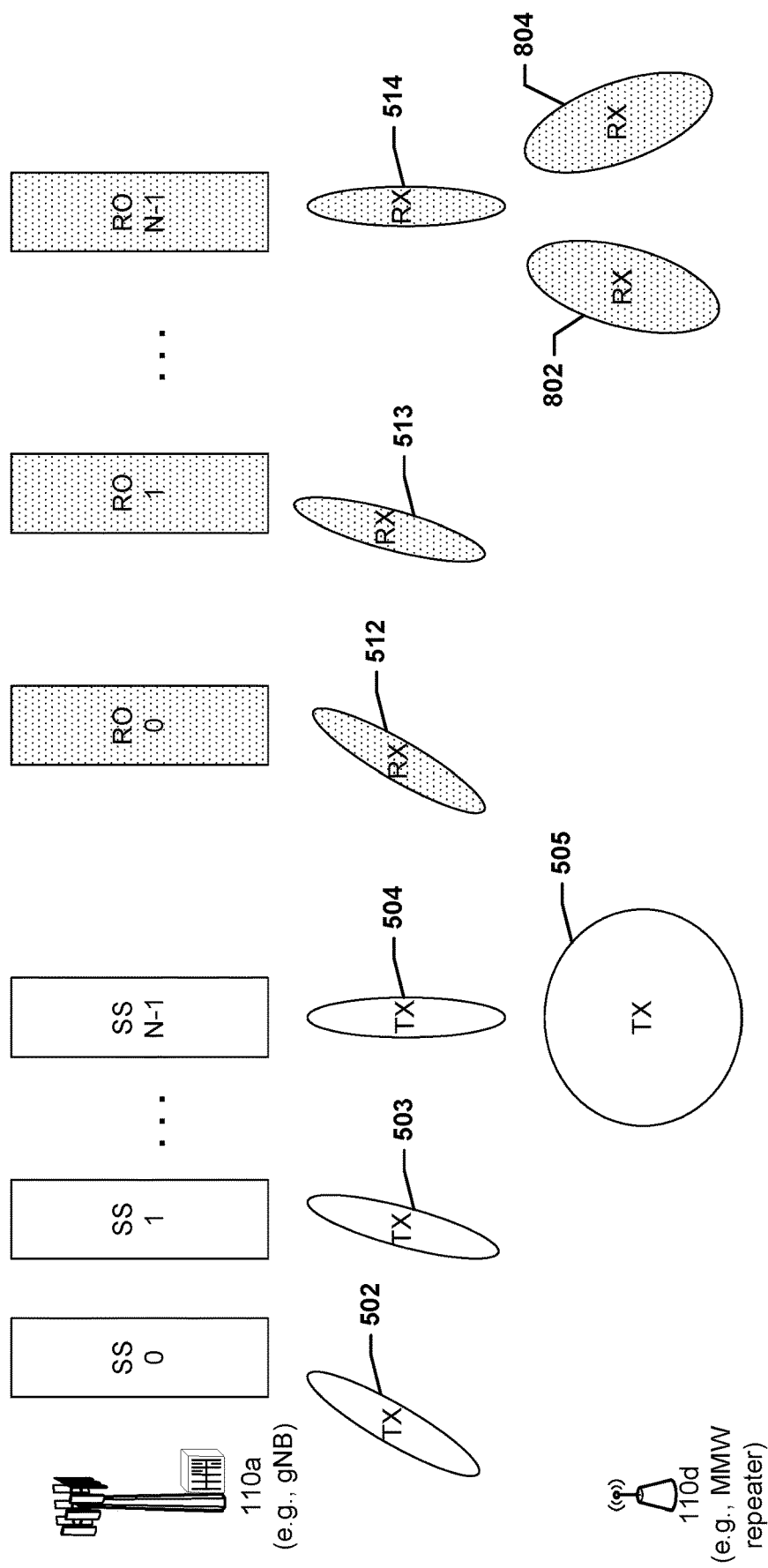
Figure 10:
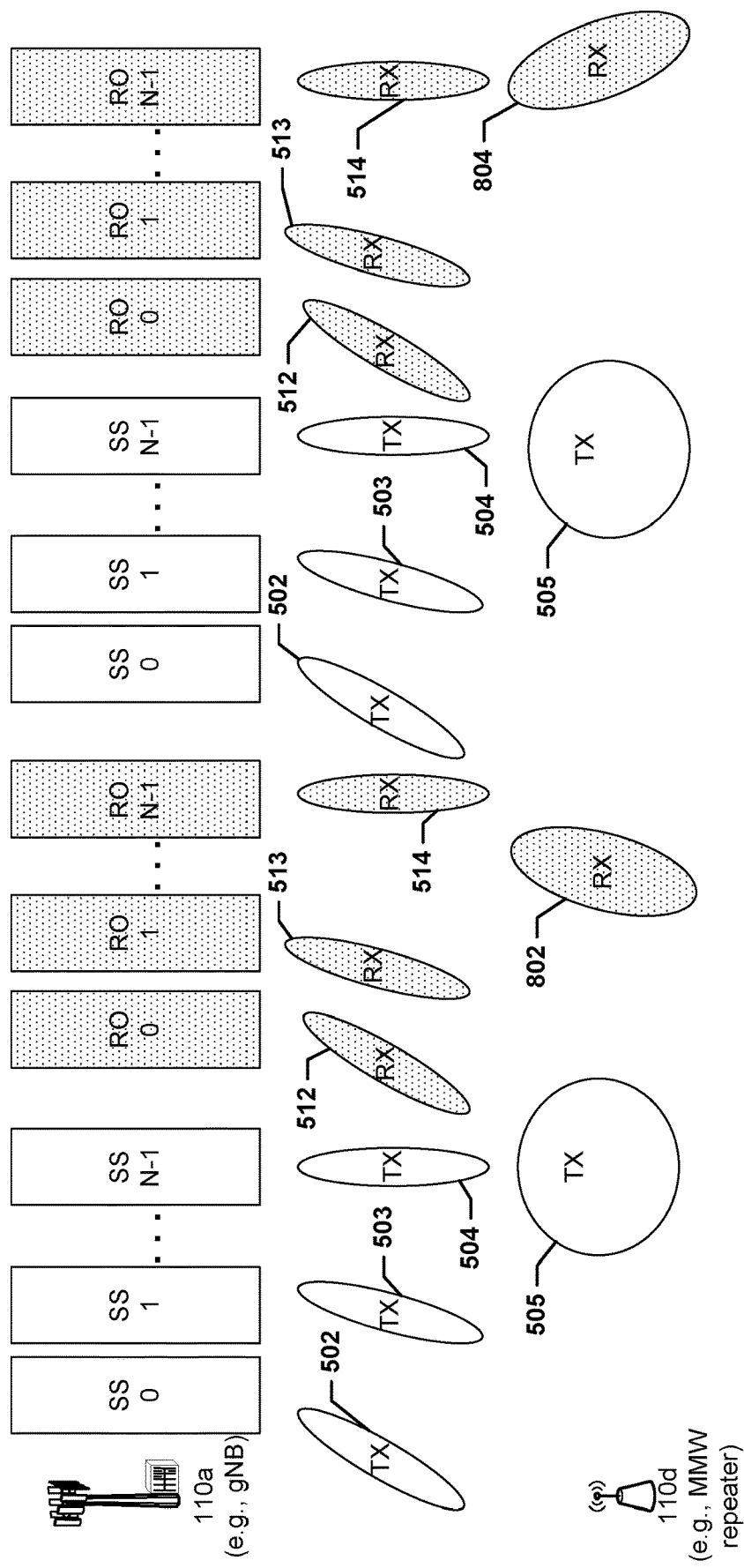
Figure 11:
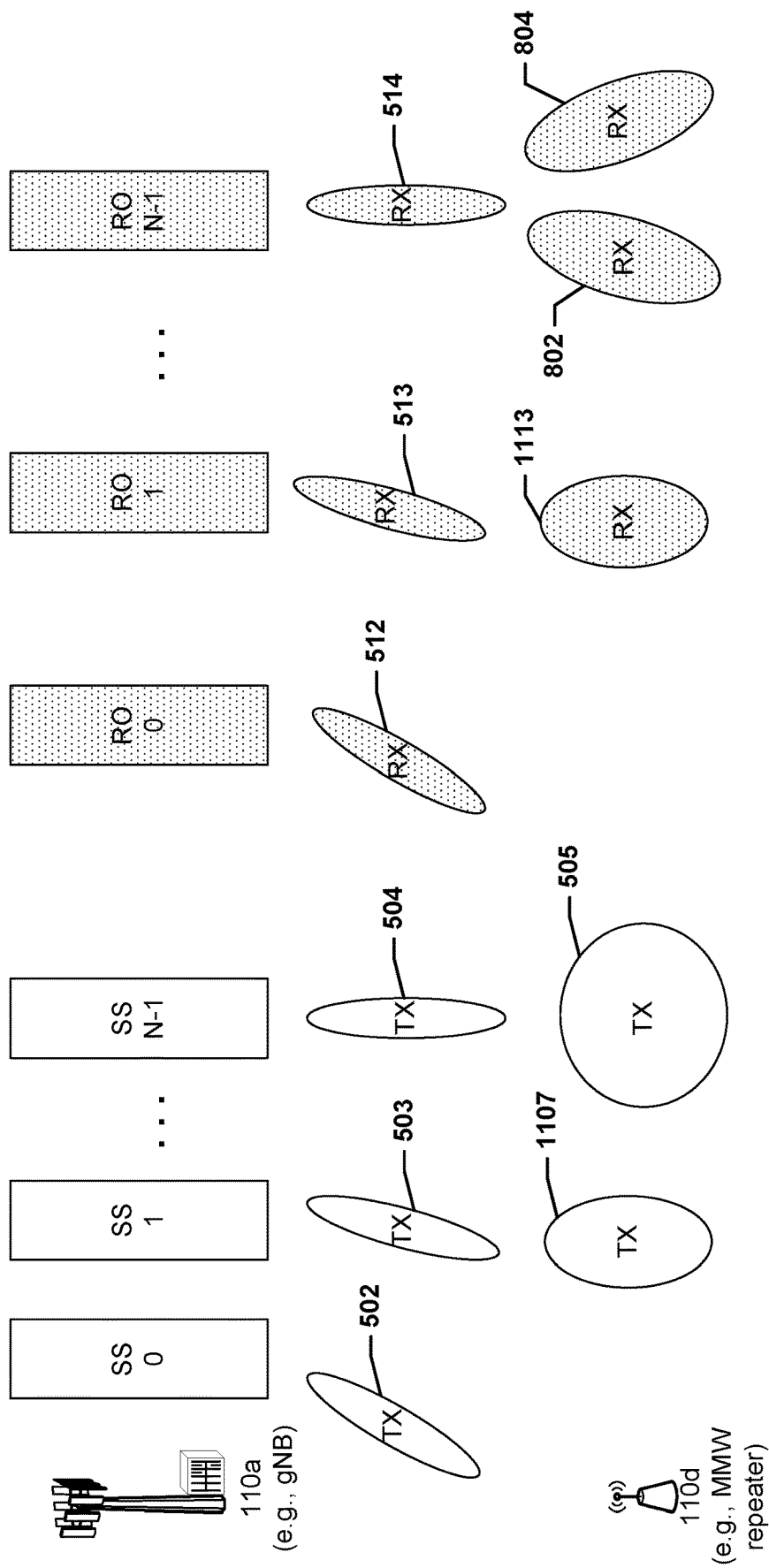

With reference to FIGS. 1-10, FIG. 10 illustrates a one-to-one mapping of ROs to SSBs, similar to that discussed in relation to FIG. 9. However, rather than controlling one or more of its RX antennas to generate the RX beam form 802 for a first period of time and a RX beam form 804 during a second period time of each successive RO instance RON-1, the RX beam forms 802 and 804 may be alternated at each successive occurrence of the RO instance RON-1. The gNB may generate and send a RACH configuration message to the MMW repeater indicating a TX beam form 505 and two RX beam forms 802 and 804 to use during RACH procedures, and may indicate to periodically switch the RX beam form from RX beam form 802 to RX beam form 804 (and vice versa) on each successive occurrence of the RO RON-1.

With reference to FIGS. 1-11, FIG. 11 illustrates a one-to-one mapping of ROs to SSBs, similar to that discussed in relation to FIG. 8 except that an additional TX beam form 507 is associated with the SSB SS1 and an additional RX beam form is associated with the RO instance RO1. The gNB may generate and send a RACH configuration message to the MMW repeater indicating both TX beam form 505 and 1107 as well as the three RX beam forms 802, 804, and 1113 to use during RACH procedures. The RX beam forms 802 and 804 may both be indicated for use by the MMW repeater in the RO instance RON-1, while the RX beam form 1113 may be indicated for use in the RO instance RO1. During the period of the RO instance RO1, the MMW repeater may control one or more of its RX antennas to generate the RX beam form 1113. During the period of the RO instance RON-1, the MMW repeater may control one or more of its RX antennas to generate the RX beam form 802 followed by the RX beam form 804.

Figure 12:
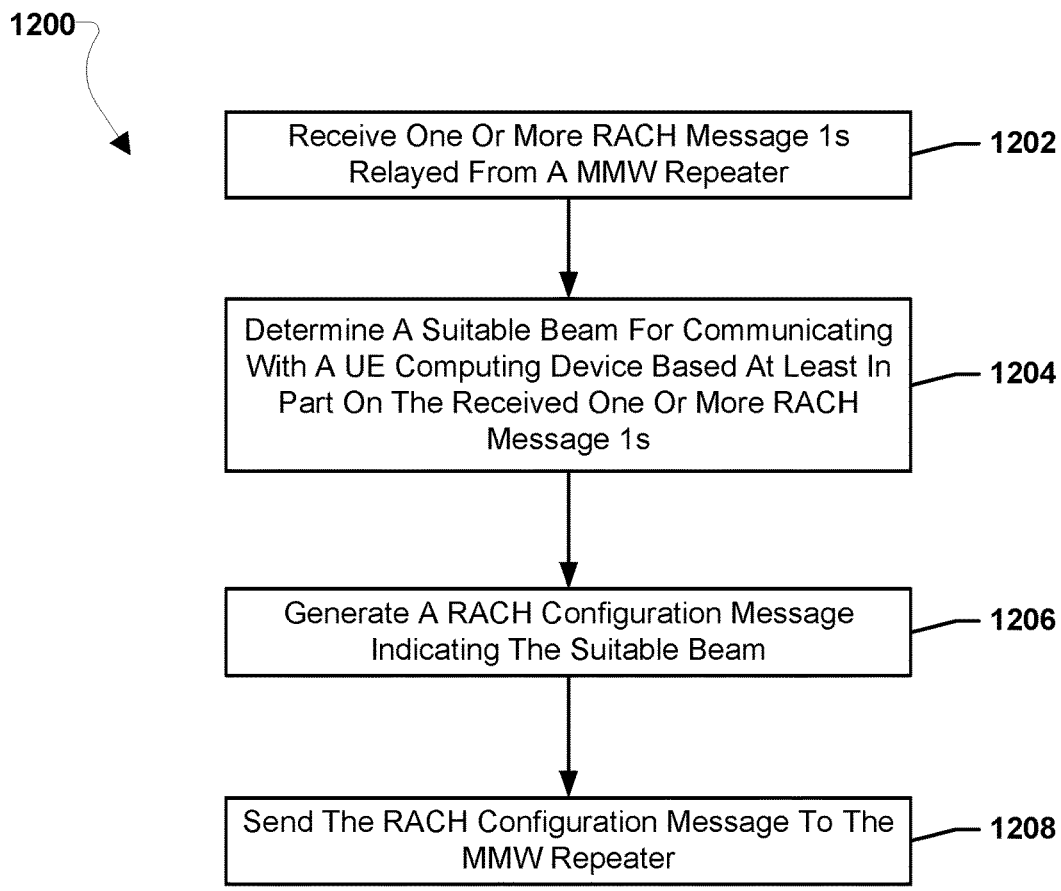
FIG. 12 is a process flow diagram illustrating a method for beam selection for RACH message relay by an MMW repeater according to an embodiment.

FIG. 12 is a process flow diagram illustrating a method 1200 for beam selection for RACH message relay according to an embodiment. With reference to FIGS. 1-12, the method 1200 may be implemented by a processor of network device, such as a base station (e.g., the base station 110a (e.g., a gNB), 350), network controller 130, donor nodes, control nodes, servers, etc. In various embodiments, the operations of the method 1200 may be performed in conjunction with the operations of the methods 600 and/or 700.

In block 1202, the processor may receive one or more RACH message 1s relayed from an MMW repeater. In various embodiments, a network computing device (e.g., a gNB) may receive one or more RACH message 1s from an MMW repeater. The one or more RACH message 1 s may have been sent by the MMW repeater using different TX beams. The one or more RACH message 1 s may be received by the network computing device (e.g., the gNB) with different powers, different quality measures, and/or at different times. The one or more RACH message 1 s may have been sent in response to a RACH configuration message indicating multiple TX beams for sending RACH message 1 s from the MMW repeater to the network computing device (e.g., the gNB).

In block 1204, the processor may determine a suitable beam for communicating with a UE computing device based at least in part on the received one or more RACH message 1s. In various embodiments, a network computing device (e.g., a gNB) may determine a suitable beam for the MMW repeater to use to communicate with a potential UE computing device (e.g., a beam used to relay a RAR message from a gNB to a UE computing device, a beam used to relay a MSG 3 from a UE computing device to a gNB, a beam used to relay a MSG 4 from a gNB to a UE computing device, etc.). This determination may be based at least in part on the received one or more RACH message 1 s from the MMW repeater. For example, the processor may determine the suitable beam based on the relative powers, qualities, and/or timings of the RACH message 1s.

In block 1206, the processor may generate a RACH configuration message indicating the suitable beam. The RACH configuration message may indicate a beam configuration corresponding to the suitable beam for the MMW repeater to use to communicate with a potential UE computing device. The suitable beam indication in the RACH configuration message may instruct the MMW repeater to use the suitable beam for relaying subsequent RACH messages to and/or from the UE computing device (e.g., relaying RAR messages, MSG 3s, MSG 4s, etc.).

In block 1208, the processor may send the RACH configuration message to the MMW repeater.

Figure 13:
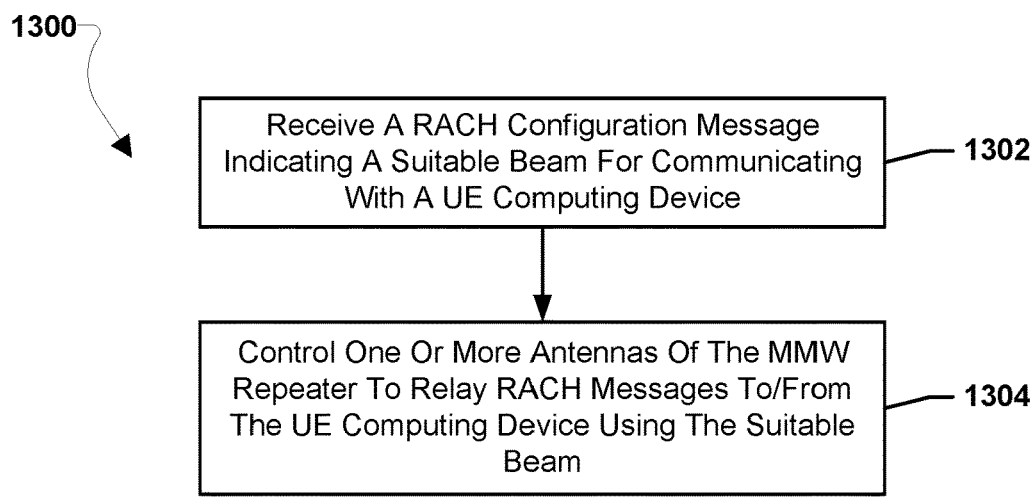
FIG. 13 is a process flow diagram illustrating a method for RACH message relay by an MMW repeater according to an embodiment.

FIG. 13 is a process flow diagram illustrating a method 1300 for RACH message relay by an MMW repeater according to an embodiment. With reference to FIGS. 1-13, the method 1300 may be implemented by a processor of a relay base station (e.g., the base station 110d, the MMW repeater 400). In various embodiments, the operations of the method 1300 may be performed in conjunction with the operations of the methods 600, 700, and/or 1200. In some embodiments, the operations of the method 1300 may be performed by a low power relay with less functionality than a gNB, such as an MMW repeater that may not include analog-to-digital converters or digital-to-analog converters in its signal path.

In block 1302, the processor may receive a RACH configuration message indicating a suitable beam for communicating with a UE computing device. In various embodiments, the RACH configuration message may be a RACH configuration message generated and sent according to the operations of method 1200 described with reference to FIG. 12. The RACH configuration message may indicate a beam configuration corresponding to the suitable beam for the MMW repeater to use to communicate with a potential UE computing device. The suitable beam indication in the RACH configuration message may instruct the MMW repeater to use the suitable beam for relaying subsequent RACH messages to and/or from the UE computing device (e.g., relaying RAR messages, MSG 3s, MSG 4s, etc.).

In block 1304, the processor may control one or more antennas of the MMW repeater (e.g., one or more RX antennas, one or more TX antennas, combinations of one or more RX antennas and one or more TX antennas, etc.) to relay RACH messages to/from the UE computing device using the suitable beam. As examples, the MMW repeater may relay an RAR message from a gNB to a UE computing device using the suitable beam, the MMW repeater may relay an MSG 3 from a UE computing device to a gNB using the suitable beam, and/or the MMW repeater may relay an MSG 4 from a gNB to a UE computing device using the suitable beam.

Figure 14:
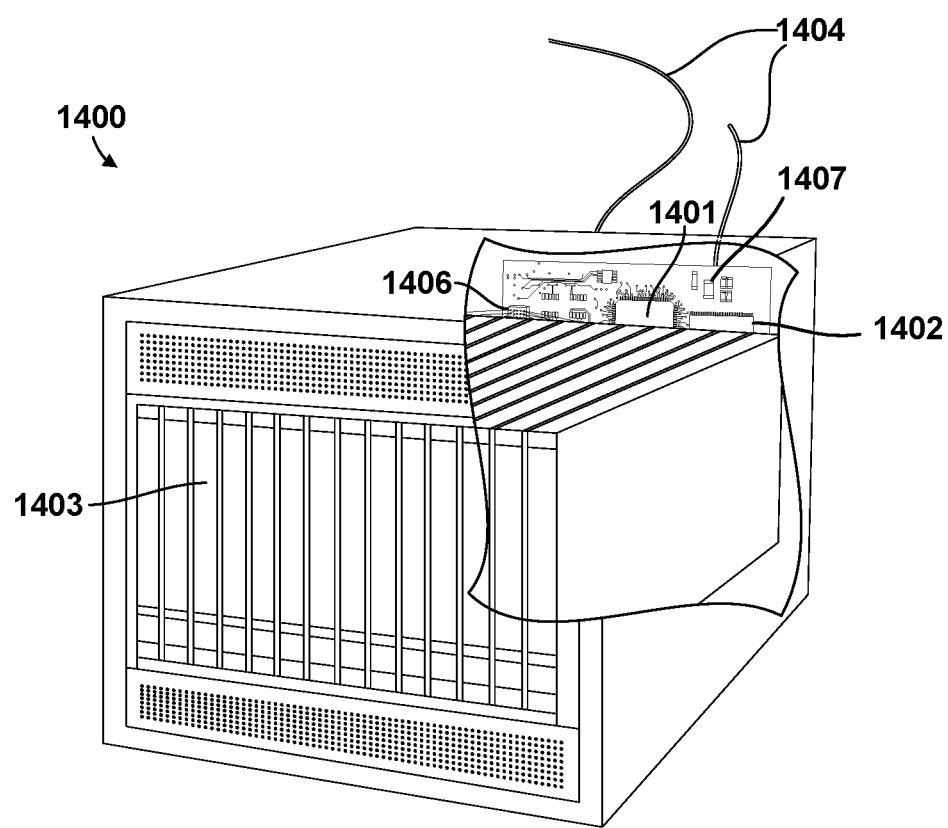
FIG. 14 is a component block diagram of a wireless router device suitable for RX beam sweep configuration of an MMW repeater in accordance with various embodiments.

Various embodiments may be implemented in a gNB as well as a variety of wireless network devices (e.g., base station 110a, 350), an example of which is illustrated in FIG. 14 in the form of a server device 1400 configured with processor executable instructions to function as a gNB. Such network computing devices may include at least the components illustrated in FIG. 14. With reference to FIGS. 1-14, the network computing device 1400 may typically include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more antennas 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
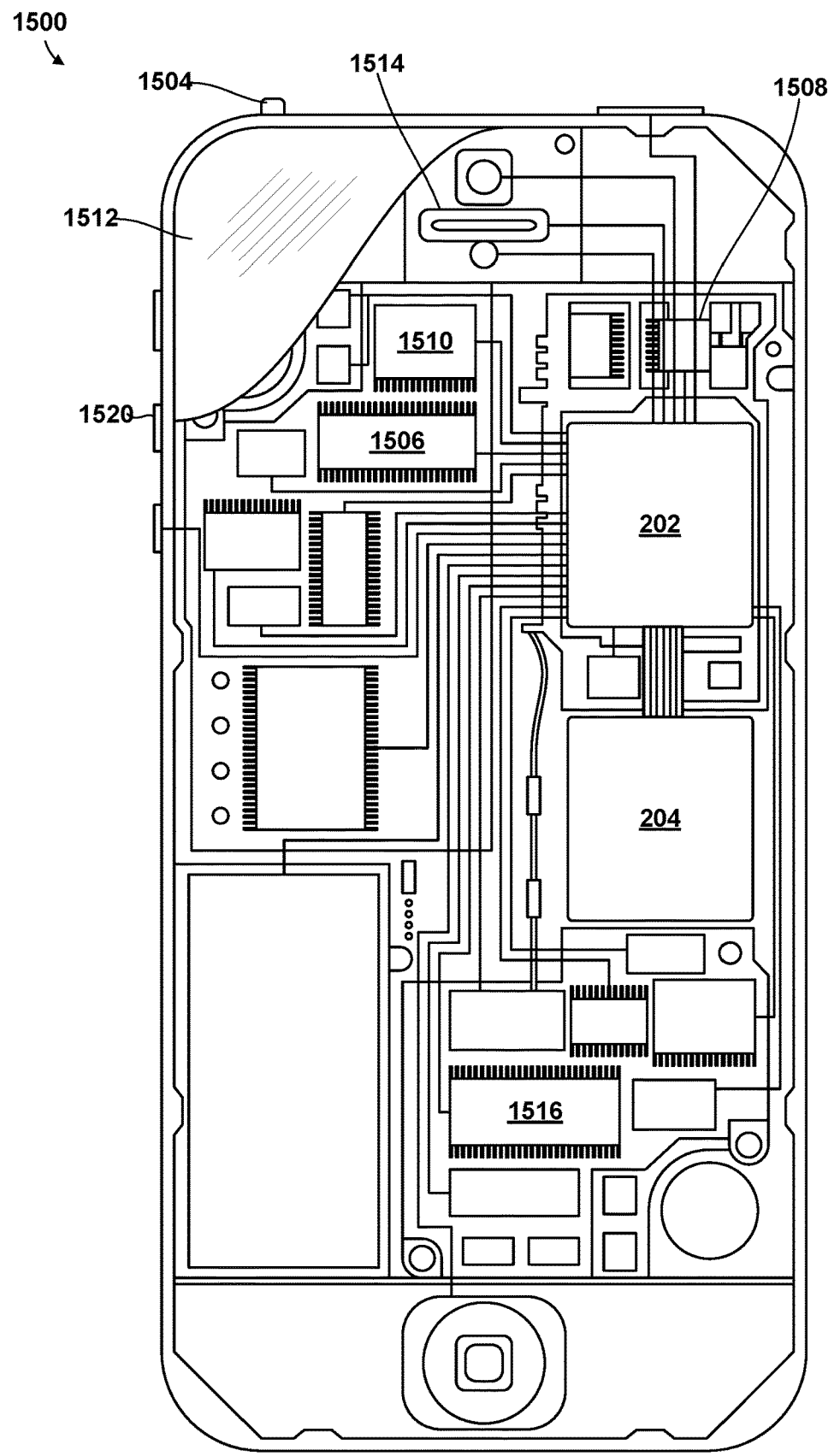
FIG. 15 is a component block diagram of a wireless communication device suitable for RX beam sweep configuration of an MMW repeater in accordance with various embodiments.

Various embodiments may be implemented on a variety of computing devices (e.g., the computing device 120a-120e, 200, 320), an example of which is illustrated in FIG. 15 in the form of a smartphone 1500. With reference to FIGS. 1-15, the smartphone 1500 may include a first SOC 202 (e.g., a SOC-CPU) coupled to a second SOC 204 (e.g., a 5G capable SOC). The first and second SOCs 202, 204 may be coupled to internal memory 1506, 1516, a display 1512, and to a speaker 1514. Additionally, the smartphone 1500 may include an antenna 1504 for sending and receiving electromagnetic radiation that may be connected to a wireless data link and/or cellular telephone transceiver 1508 coupled to one or more processors in the first and/or second SOCs 202, 204. Smartphones 1500 typically also include menu selection buttons or rocker switches 1520 for receiving user inputs.

A typical smartphone 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1508 and CODEC 1510 may include a digital signal processor (DSP) circuit (not shown separately).

The processors of the wireless network computing device 1200 and the smart phone 1500 may be any programmable microprocessor, microcomputer or multiple processor chip or chips that can be configured by software instructions (applications) to perform a variety of functions, including the functions of the various embodiments described below.

In some mobile devices, multiple processors may be provided, such as one processor within an SOC 204 dedicated to wireless communication functions and one processor within an SOC 202 dedicated to running other applications. Typically, software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for receiver (RX) beam sweep configuration of a millimeter wave (MMW) repeater during random access channel (RACH) procedures, comprising:
   determining, by a processor of a network device, two or more different RX beam sweep configurations for one or more RACH occurrences (ROs) associated with a synchronization signal block (SSB);
   generating, by the processor of the network device, a RACH configuration message indicating the two or more different RX beam sweep configurations for the one or more ROs; and
   sending, by the processor of the network device, the RACH configuration message to an MMW repeater.

2. The method of claim 1, wherein the network device is a Next Generation NodeB (gNB).

3. The method of claim 2, wherein the two or more different RX beam sweep configurations together cover a spatial domain of a transmit (TX) beam sweep configuration for the SSB.

4. The method of claim 2, wherein the two or more different RX beam sweep configurations are based at least in part on a beam sweep capability of the MMW repeater.

5. The method of claim 2, wherein the two or more different RX beam sweep configurations are based at least in part on a format of a RACH message 1.

6. The method of claim 2, wherein the two or more different RX beam sweep configurations are based at least in part on a number of MMW repeaters in use by the gNB.

7. The method of claim 2, further comprising:
   determining, by the processor of the gNB, a format of a RACH message 1 based at least in part on the two or more different RX beam sweep configurations.

8. The method of claim 2, wherein:
   the one or more ROs are a single RO; and
   the RACH configuration message indicates the MMW repeater is to apply all of the two or more different RX beam sweep configurations during each instance of the single RO.

9. The method of claim 2, wherein:
   the one or more ROs are a single RO; and
   the RACH configuration message indicates the MMW repeater is to apply a next one of the two or more different RX beam sweep configurations at each successive instance of the single RO.

10. The method of claim 2, wherein:
the one or more ROs are two or more ROs; and
the RACH configuration message indicates a selected one of the two or more different RX beam sweep configurations the MMW repeater is to apply at each of the respective two or more ROs.

11. The method of claim 2, further comprising:
determining, by the processor of the gNB, another two or more different RX beam sweep configurations for the one or more ROs;
generating, by the processor of the gNB, a new RACH configuration message indicating the another two or more different RX beam sweep configurations for the one or more ROs; and
sending, by the processor of the gNB, the new RACH configuration message to the MMW repeater.

12. The method of claim 2, further comprising:
sending, by the processor of the gNB, the SSB; and
scanning, by the processor of the gNB, for a RACH message 1 during the one or more ROs.

13. The method of claim 12, wherein the RACH configuration message further indicates at least one of one or more beams the MMW repeater is to use for relaying and the SSB or one or more TX beam the MMW repeater is to use for sending any received RACH 1 message to the gNB.

14. The method of claim 2, further comprising:
receiving, by the processor of the gNB, one or more RACH message 1s from the MMW repeater;
determining, by the processor of the gNB, a suitable beam for communicating with a computing device based at least in part on the received one or more RACH message 1s;
generating, by the processor of the gNB, a second RACH configuration message indicating the suitable beam; and
sending, by the processor of the gNB, the second RACH configuration message to the MMW repeater.

15. A method for receiver (RX) beam sweep configuration of a millimeter wave (MMW) repeater during random access channel (RACH) procedures, comprising:
receiving, by a processor of an MMW repeater, a RACH configuration message indicating two or more different RX beam sweep configurations for one or more RACH occurrences (ROs) associated with a synchronization signal block (SSB); and
controlling, by the processor of the MMW repeater, one or more RX antennas of the MMW repeater to perform RX beam sweeping during the one or more ROs according to the RACH configuration message to receive a RACH message 1 form a computing device.

16. The method of claim 15, wherein:
the one or more ROs are a single RO; and
controlling the one or more RX antennas of the MMW repeater to perform RX beam sweeping during the one or more ROs comprises controlling the one or more RX antennas of the MMW repeater to apply all of the two or more different RX beam sweep configurations during each instance of the single RO.

17. The method of claim 15, wherein:
the one or more ROs are a single RO; and
controlling the one or more RX antennas of the MMW repeater to perform RX beam sweeping during the one or more ROs comprises controlling the one or more RX antennas of the MMW repeater to apply a next one of the two or more different RX beam sweep configurations during each successive instance of the single RO.

18. The method of claim 15, wherein:
the one or more ROs are two or more ROs; and
controlling the one or more RX antennas of the MMW repeater to perform RX beam sweeping during the one or more ROs comprises controlling the one or more RX antennas of the MMW repeater to apply a selected one of the two or more different RX beam sweep configurations during each of the respective two or more ROs.

19. The method of claim 15, further comprising:
receiving, by the processor of the MMW repeater, a new RACH configuration message indicating another two or more different RX beam sweep configurations for the one or more ROs; and
controlling, by the processor of the MMW repeater, the one or more RX antennas of the MMW repeater to perform RX beam sweeping during the one or more ROs according to the new RACH configuration message to receive a RACH message 1 form a UE computing device.

20. The method of claim 15, wherein the RACH configuration message is received from a Next Generation NodeB (gNB).

21. The method of claim 20, further comprising:
sending, by the processor of the MMW repeater, a received RACH message 1 using one or more TX beams to the gNB, wherein the one or more TX beams are indicated in the RACH configuration message.

22. The method of claim 20, further comprising:
sending, by the processor of the MMW repeater, a received RACH message 1 using one or more TX beams to the gNB;
receiving, by the processor of the MMW repeater, a second RACH configuration message indicating a suitable beam for communicating with the computing device; and
controlling, by the processor of the MMW repeater, one or more antennas of the MMW repeater to relay a RACH message between the computing device and the gNB using the suitable beam.

23. A network device, comprising:
a processor configured with processor-executable instructions to:
determine two or more different RX beam sweep configurations for one or more random access channel (RACH) occurrences (ROs) associated with a synchronization signal block (SSB);
generate a RACH configuration message indicating the two or more different RX beam sweep configurations for the one or more ROs; and
send the RACH configuration message to a millimeter wave (MMW) repeater.

24. The network device of claim 23, wherein the processor is further configured with processor-executable instructions such that:
the one or more ROs are a single RO; and
the RACH configuration message indicates the MMW repeater is to apply all of the two or more different RX beam sweep configurations during each instance of the single RO.

25. The network device of claim 23, wherein the processor is further configured with processor-executable instructions such that:
the one or more ROs are a single RO; and
the RACH configuration message indicates the MMW repeater is to apply a next one of the two or more different RX beam sweep configurations at each successive instance of the single RO.

26. The network device of claim 23, wherein the processor is further configured with processor-executable instructions such that:
the one or more ROs are two or more ROs; and
the RACH configuration message indicates a selected one of the two or more different RX beam sweep configurations the MMW repeater is to apply at each of the respective two or more ROs.

27. A millimeter wave (MMW) repeater, comprising:
one or more receiver (RX) antennas; and
a processor configured with processor-executable instructions to:
receive a random access channel (RACH) configuration message indicating two or more different RX beam sweep configurations for one or more RACH occurrences (ROs) associated with a synchronization signal block (SSB); and
control the one or more RX antennas to perform RX beam sweeping during the one or more ROs according to the RACH configuration message to receive a RACH message 1 form a computing device.

28. The MMW repeater of claim 27, wherein the processor is further configured with processor-executable instructions such that:
the one or more ROs are a single RO; and
controlling the one or more RX antennas to perform RX beam sweeping during the one or more ROs comprises controlling the one or more RX antennas to apply all of the two or more different RX beam sweep configurations during each instance of the single RO.

29. The MMW repeater of claim 27, wherein the processor is further configured with processor-executable instructions such that:
the one or more ROs are a single RO; and
controlling the one or more RX antennas to perform RX beam sweeping during the one or more ROs comprises controlling the one or more RX antennas to apply a next one of the two or more different RX beam sweep configurations during each successive instance of the single RO.

30. The MMW repeater of claim 27, wherein the processor is further configured with processor-executable instructions such that:
the one or more ROs are two or more ROs; and
controlling the one or more RX antennas to perform RX beam sweeping during the one or more ROs comprises controlling the one or more RX antennas to apply a selected one of the two or more different RX beam sweep configurations during each of the respective two or more ROs.

* * * * *